United States Patent
Kamen et al.

(10) Patent No.: US 7,469,760 B2
(45) Date of Patent: Dec. 30, 2008

(54) HYBRID ELECTRIC VEHICLES USING A STIRLING ENGINE

(75) Inventors: Dean L. Kamen, Bedford, NH (US); Christopher C. Langenfeld, Nashua, NH (US); Michael Norris, Manchester, NH (US); Jason Michael Sachs, Goffstown, NH (US)

(73) Assignee: DEKA Products Limited Partnership, Manchester, NH (US)

( * ) Notice: Subject to any disclaimer, the term of this patent is extended or adjusted under 35 U.S.C. 154(b) by 840 days.

(21) Appl. No.: 10/395,028

(22) Filed: Mar. 21, 2003

(65) Prior Publication Data
US 2003/0230440 A1    Dec. 18, 2003

Related U.S. Application Data

(63) Continuation-in-part of application No. 09/517,808, filed on Mar. 2, 2000, now Pat. No. 6,536,207.

(51) Int. Cl.
*B60K 1/00* (2006.01)

(52) U.S. Cl. ............. 180/65.3; 180/65.4; 180/65.1

(58) Field of Classification Search ......... 180/65.1, 180/65.2, 65.3, 65.4, 7.1, 907, 19.1, 19.2; 60/517, 518, 523, 524, 525
See application file for complete search history.

(56) References Cited

U.S. PATENT DOCUMENTS

| | | | | |
|---|---|---|---|---|
| 4,434,617 A * | 3/1984 | Walsh | ............ | 60/520 |
| 4,489,242 A * | 12/1984 | Worst | ............ | 307/10.1 |
| 4,511,805 A * | 4/1985 | Boy-Marcotte et al. | ........ | 290/2 |
| 4,642,547 A * | 2/1987 | Redlich | ............ | 322/3 |
| 4,809,804 A * | 3/1989 | Houston et al. | ............ | 180/65.5 |
| 4,996,841 A * | 3/1991 | Meijer et al. | ............ | 60/525 |
| 5,111,899 A * | 5/1992 | Reimann | ............ | 180/65.1 |
| 5,168,947 A * | 12/1992 | Rodenborn | ............ | 180/19.1 |
| 5,172,784 A | 12/1992 | Varela, Jr. | | |
| 5,366,036 A * | 11/1994 | Perry | ............ | 180/65.1 |
| 5,441,401 A * | 8/1995 | Yamaguro et al. | ............ | 431/4 |
| 5,701,965 A * | 12/1997 | Kamen et al. | ............ | 180/7.1 |
| 5,791,425 A * | 8/1998 | Kamen et al. | ............ | 180/7.1 |
| 5,864,770 A * | 1/1999 | Ziph et al. | ............ | 701/110 |
| 5,875,863 A * | 3/1999 | Jarvis et al. | ............ | 180/65.4 |
| 5,971,091 A * | 10/1999 | Kamen et al. | ............ | 180/218 |
| 5,975,225 A * | 11/1999 | Kamen et al. | ............ | 180/7.1 |
| 5,987,886 A * | 11/1999 | Sekiya et al. | ............ | 60/523 |
| 6,202,776 B1 * | 3/2001 | Masberg et al. | ............ | 180/65.2 |

(Continued)

FOREIGN PATENT DOCUMENTS

DE    197 45 167 A1    6/1998

(Continued)

*Primary Examiner*—Paul N. Dickson
*Assistant Examiner*—Vaughn Coolman
(74) *Attorney, Agent, or Firm*—Michelle Saquet Temple

(57) ABSTRACT

A personal vehicle for transporting a user over a surface including an external combustion engine. The vehicle includes a generator for converting the mechanical energy produced by the external combustion engine to electrical energy and an energy storage device for storing power provided by the generator and for providing power to the external combustion engine and the assembly. The personal vehicle includes a controller for controlling a total power load placed on the external combustion engine providing short term regulation of external combustion engine parameters.

10 Claims, 16 Drawing Sheets

U.S. PATENT DOCUMENTS 6,380,637 B1    4/2002   Hsu et al.
6,435,293 B1 *  8/2002   Williams .................. 180/65.1

FOREIGN PATENT DOCUMENTS

| EP | 0 900 328 B1 | 11/2002 |
| WO | WO 90/08891 | 8/1990 |
| WO | WO 01/65100 A2 | 9/2001 |

* cited by examiner

Section B-B

Section A-A

HYBRID ELECTRIC VEHICLES USING A STIRLING ENGINE

The present application is a continuation-in-part of U.S. patent application Ser. No. 09/517,808, filed Mar. 2, 2000, which application is herein incorporated by reference in its entirety.

TECHNICAL FIELD

The present invention pertains to hybrid electric vehicles utilizing an external combustion engine and in particular, a Stirling cycle engine.

BACKGROUND OF THE INVENTION

In response to energy and environmental issues and concerns, hybrid electric vehicles, such as buses and cars, have been developed in an attempt to provide efficient, low emission vehicles. In general, a hybrid electric vehicle combines a combustion engine with a battery and an electric motor. Typically, the combustion engine is an internal combustion engine. Some hybrid electric vehicles have been developed using external combustion engines, such as a Stirling engine.

As mentioned, one type of external combustion engine which may be used in a hybrid electric vehicle is a Stirling cycle engine. A Stirling cycle engine produces both mechanical energy and heat energy appropriate for space heating. The history of Stirling cycle engines is described in detail in Walker, *Stirling Engines,* Oxford University Press (1980), herein incorporated by reference. The principle of operation of a Stirling engine is well known in the art. Stirling cycle engines have not generally been used in practical applications, such as hybrid electric vehicles, due to several daunting engineering challenges in their development. These involve such practical considerations as efficiency, vibration, lifetime and cost.

For example, Stirling cycle engines generally make poor traction motors due to poor throttle response and limited power in comparison to an internal combustion. The response time of a Stirling cycle engine is limited by the heat transfer rates between the external combustion gases and the internal working fluid of the engine and may be on the order of 30 seconds. The response time of an internal combustion engine, on the other hand, is very short because the combustion gas is the working fluid and can be directly controlled by the fuel flow rate. Prior attempts to increase the responsiveness of a Stirling cycle engine provided a variable dead space for the working fluid as described in U.S. Pat. No. 3,940,933 to Nystrom and U.S. Pat. No. 4,996,841 to Meijer or controlled the pressure of the working fluid as described in U.S. Pat. No. 5,755,100 to Lamos. The foregoing references are hereby incorporated by reference in their entirety. However, both these approaches tend to increase the complexity, size, and weight of the engine design.

SUMMARY OF THE INVENTION

In accordance with an embodiment of the invention, a personal vehicle for transporting a user over a surface includes a support for supporting the user, a ground contacting module having at least one ground contacting member and a drive arrangement for causing locomotion of the support, ground contacting module and user over a surface. The drive arrangement includes an external combustion engine for generating mechanical energy and thermal energy, a generator for converting the mechanical energy produced by the external combustion engine to electrical energy and an energy storage device for storing power provided by the generator and for providing power to the external combustion engine and the assembly. The external combustion engine and the generator may be housed in a hermetically sealed pressure vessel. In addition, the personal vehicle includes a controller for controlling a total power load placed on the external combustion engine so as to provide short term regulation of external combustion engine parameters.

In one embodiment, the external combustion engine is a Stirling cycle engine. The thermal energy produced by the external combustion engine may be used to provide heat to an area surrounding the personal vehicle. In another embodiment, the personal vehicle includes a power output coupled to the energy storage device for providing power to an external load. In yet another embodiment, the personal vehicle has modes in which it is not statically stable. The personal vehicle may have balancing capability on lateral and foe-aft places defined by the support.

In another embodiment of the invention a personal vehicle for transporting a user over a surface includes a support for supporting the user, a ground contacting module having at least one ground contacting member and a drive arrangement for causing locomotion of the support, ground contacting module and user over a surface. The drive arrangement includes an external combustion engine for generating mechanical energy and thermal energy, a generator for converting the mechanical energy produced by the external combustion engine to electrical energy and an energy storage device for storing power provided by the generator and for providing power to the external combustion engine and the assembly. The vehicle further includes a power output coupled to the energy storage device for providing power to an external load, while the vehicle is stationary. The vehicle may include an inverter coupled to the energy storage device so that alternating current power may be derive for an external load.

BRIEF DESCRIPTION OF THE DRAWINGS

The invention will be more readily understood by reference to the following description taken with the accompanying drawings, in which.

DETAILED DESCRIPTION OF PREFERRED EMBODIMENTS

In accordance with an embodiment of the invention, a personal vehicle is provided that includes a hybrid Stirling engine/generator to provide power to the vehicle. The hybrid Stirling engine/generator as described herein has the benefits of a Stirling engine such as low emissions, long life and quiet operation. In addition, the hybrid Stirling engine/generator has good throttle response and instant power as required by a vehicle for operation. The hybrid Stirling engine/generator is advantageously of a small size (5 kW or less) with ultra low emissions and may be implemented in a variety of personal vehicles.

Figure 1:
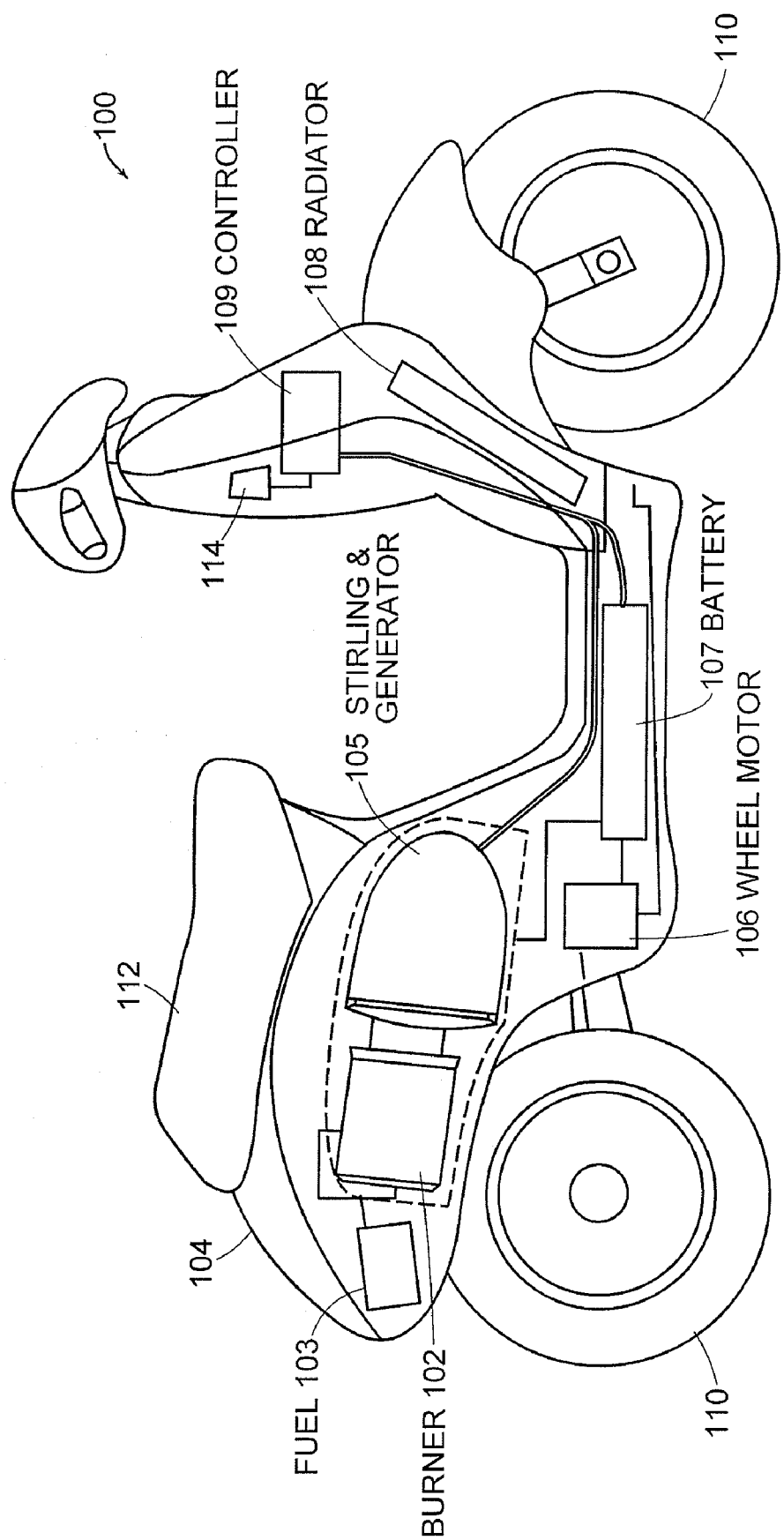
FIG. 1 is a schematic diagram of a personal hybrid electric vehicle using a Stirling engine in accordance with an embodiment of the invention.

The invention may be implemented in a wide range of embodiments. FIG. 1 is a schematic diagram of a personal hybrid electric vehicle using a Stirling engine in accordance with an embodiment of the invention. A personal hybrid electric vehicle as used in the description and the following claims means a vehicle with a weight less than 1400 lbs, with an engine power output less than 5 kW and at least one ground contacting member, such as a wheel. FIG. 1 shows a scooter type personal vehicle 100 with two ground contacting members 110. The scooter 100 is powered by an external combustion engine 105, preferably a Stirling cycle engine. A support 104 covers the components of the scooter and serves to support a user of the scooter 100. The support 104 includes a seat 112 on which a user may sit while using the vehicle.

Scooter 100 includes a drive arrangement to provide the power to cause the locomotion of the scooter. The drive arrangement includes a Stirling cycle engine and generator combination 105 and an energy storage device 107. The outputs of the Stirling cycle engine 105 during operation typically include both mechanical energy and residual heat energy. The Stirling cycle engine 105 is coupled to the generator and the generator/engine combination may be housed in a sealed pressure vessel. Alternatively, the generator may be external to the pressure vessel containing the engine. The pressure vessel contains a high pressure working fluid, preferably helium, nitrogen or a mixture of these gases at 20 to 30 atmospheres pressure. The generator converts the mechanical energy produced by the Stirling cycle engine to electrical energy. The working gas of the Stirling engine is heated by heat from an external thermal source, such as burner 102. Burner 102 burns a fuel provided by a fuel supply 103.

The Stirling cycle engine and generator combination 105 produces electrical energy that may be used to power the scooter. Accordingly, the generator is used to power a motor 106 coupled to the ground contacting members 110. The electrical energy produced is also stored in the energy storage device 107. In a preferred embodiment, the energy storage device is a rechargeable battery. The energy storage device may also be used to power the scooter 100. Accordingly, energy storage device 107 is coupled to the motor 106.

Scooter 100 may also include a radiator 108 coupled to the Stirling cycle engine 105 to provide cooling during operation of the engine. A controller 109 is coupled to the Stirling cycle engine and generator 105, a fuel regulator (not shown, a blower (not shown) and the energy storage device 107. Controller 109 is used to control the power output produced by the Stirling engine and generator. An electrical output 114 is optionally connected to the energy storage device 107 to provide electricity to an external load when the scooter is not being used for transportation.

Figure 2:
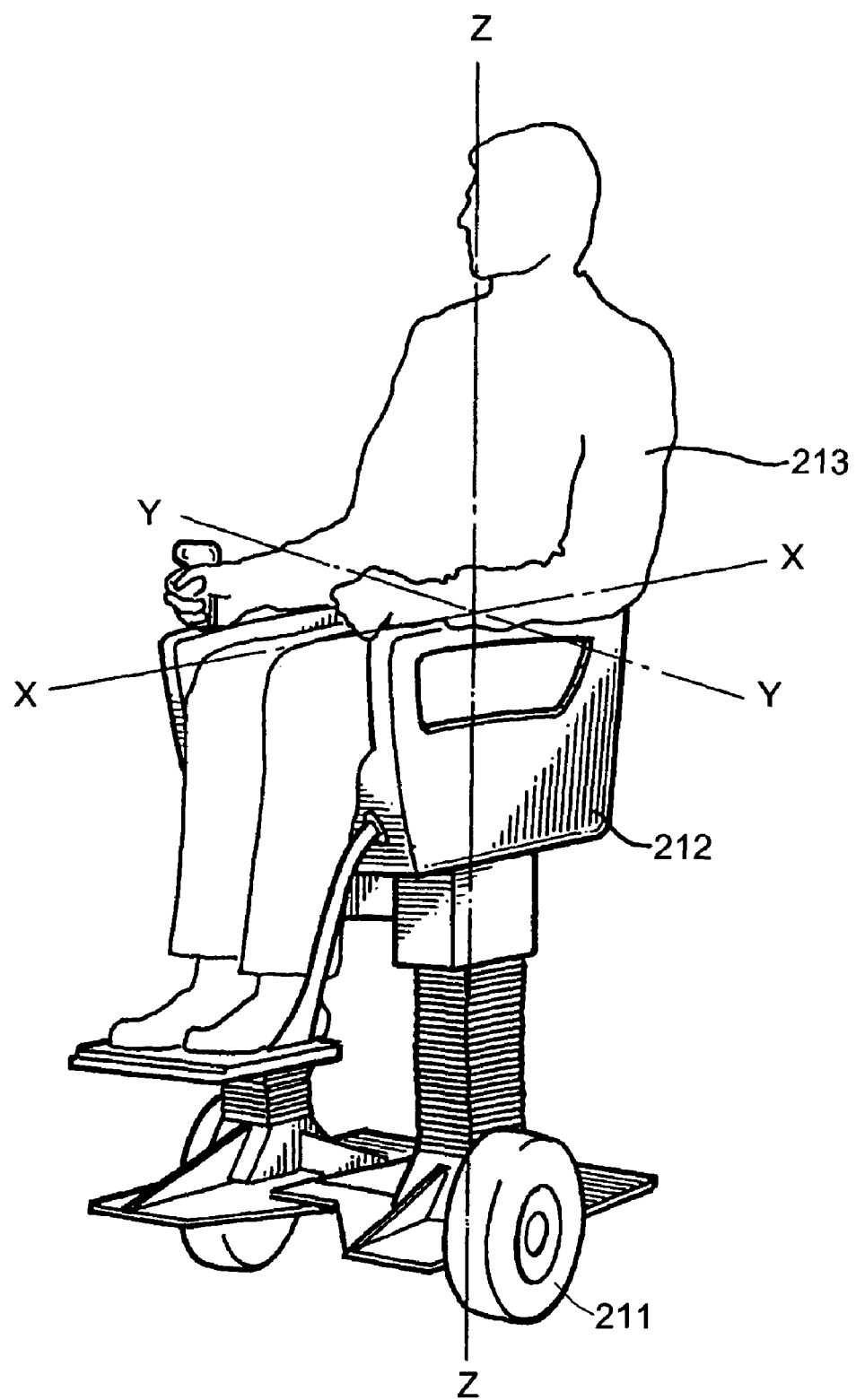
FIG. 2 is a schematic diagram of a personal hybrid electric vehicle in accordance with an alternative embodiment of the invention.
Figure 3:
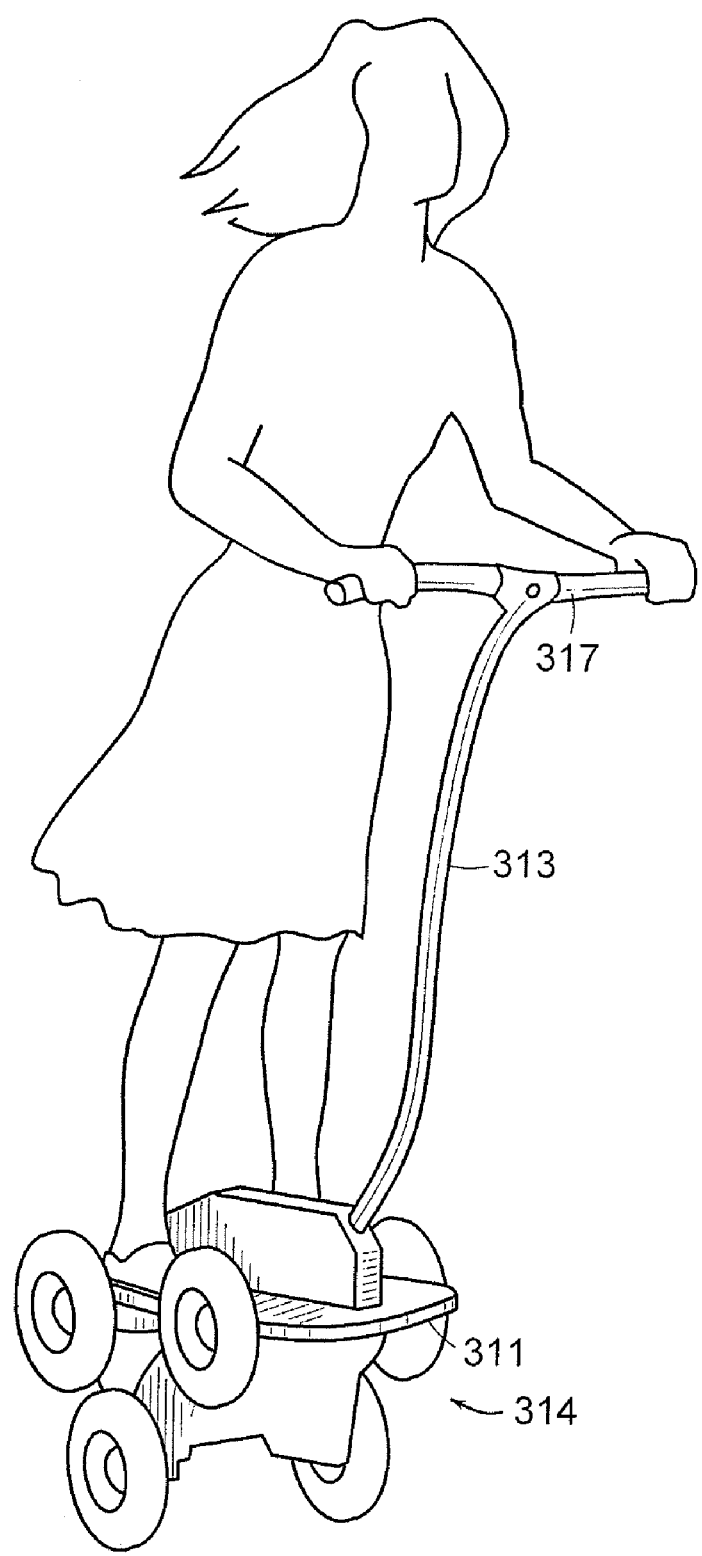
FIG. 3 is a schematic diagram of a personal hybrid electric vehicle in accordance with an alternative embodiment of the invention.

FIG. 2 and FIG. 3 show alternative forms of a personal hybrid electric vehicle. FIG. 2 shows an exemplary electric wheelchair. A support arrangement 212 includes a chair, on which a user 213 may be seated. A pair of laterally disposed ground contacting members 211 is used to suspend the user 213 over a surface with respect to which the user is being transported. In a further embodiment, the hybrid Stirling engine/generator may be used to replace the battery pack used in may standard electric wheelchairs. FIG. 3 shows a scooter on which a user stands. A support arrangement includes a platform 311 on which the user stands and holds grip 317 on handle 313 attached to the platform. The scooter also includes ground contacting members 314. In a further embodiment, the hybrid Stirling engine/generator may be used in a personal vehicle that includes a set of pedals on the support arrangement that may be used by the user during operation.

In alternative embodiments, the personal vehicle is configured such that the vehicle lacks inherent stability at least a portion of the time with respect to a vertical in a fore-aft plane but is relatively stable with respect to a vertical in the lateral plane. These dynamically stabilized personal vehicles include a control system that actively maintains the stability of the personal vehicle while the vehicle is operating. The control system maintains the stability of the personal vehicle by continuously sensing the orientation of the vehicle, determining the corrective action to maintain stability, and commanding the wheel motors to make the corrective action. Dynamically stabilized vehicles are discussed in more detail in U.S. Pat. Nos. 5,701,965 and 5,971,091, both of which are herein incorporated by reference.

Figure 4:
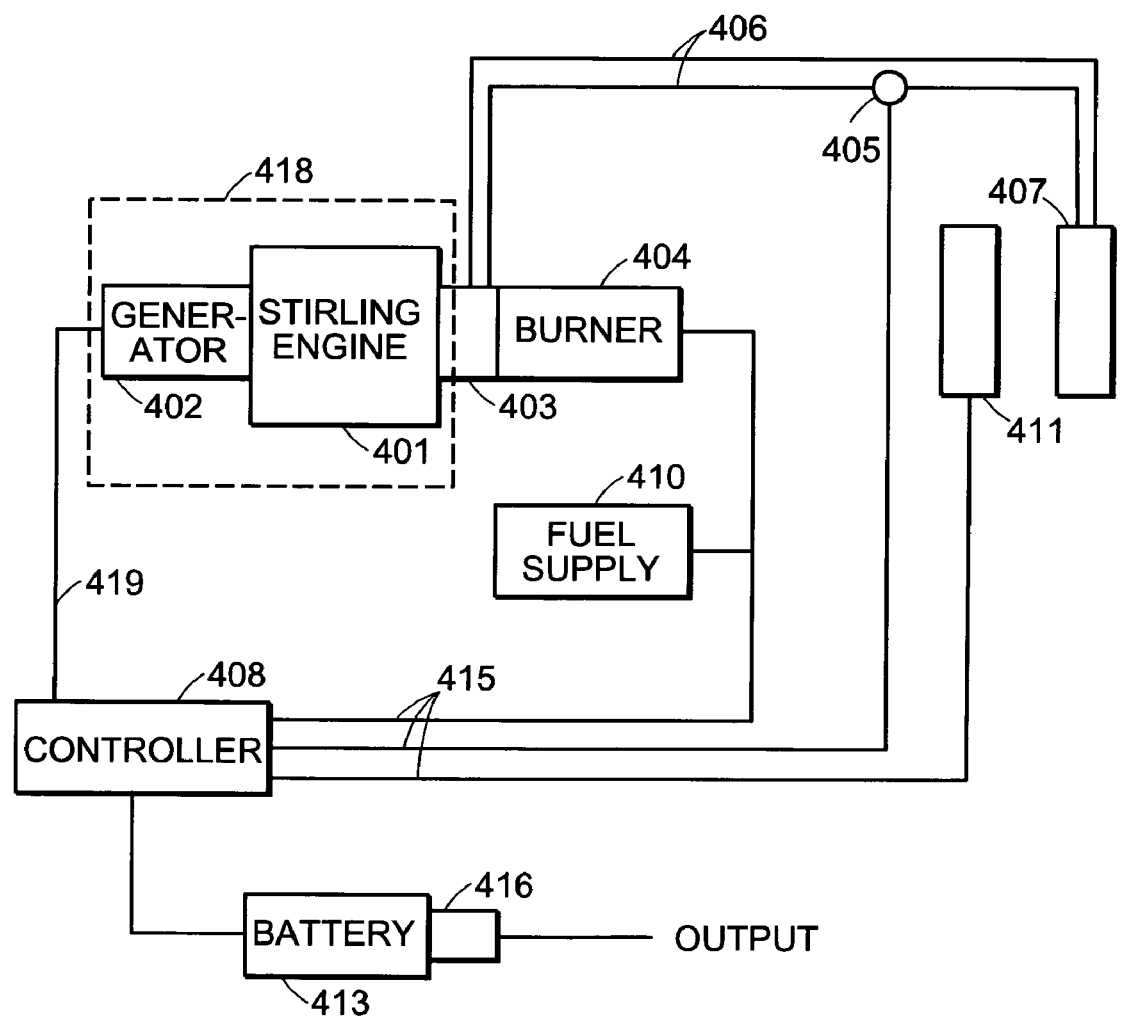
FIG. 4 is a schematic block diagram of the power, drive and control components for the personal hybrid electric vehicle of FIG. 1 in accordance with an embodiment of the invention.

FIG. 4 is a schematic block diagram of the power, drive and control components of the personal vehicle of FIG. 1, in accordance with an embodiment of the invention. As discussed above with respect to FIG. 1, the personal vehicle includes a Stirling engine 401 coupled to a generator 402. The outputs of the Stirling cycle engine 401 during operation include both mechanical energy and residual heat energy. Heat produced in the combustion of a fuel in a burner 404 is applied as an input to the Stirling cycle engine 401, and partially converted to mechanical energy. The unconverted heat or thermal energy accounts for 65 to 85% of the energy released in the burner 404. This heat is available to provide heating to the local environment around the scooter. The exhaust gases are relatively hot, typically 100 to 300° C., and represent 10 to 20% of the thermal energy produced by the Stirling engine 401. The cooler rejects 80 to 90% of the thermal energy at 10 to 40° C. above the ambient temperature. The heat is rejected to either a flow of water, or, more typically, to the air via a radiator 407.

As mentioned above, burner 404 combusts a fuel to produce hot exhaust gases which are used to drive the Stirling engine 401. A controller 408 is coupled to the burner 404 and a fuel supply 410. Controller 408 delivers a fuel from the fuel supply 410 to the burner 404. The controller 408 also delivers a measured amount of air to the burner 404 to advantageously ensure substantially complete combustion. The fuel combusted by burner 404 is preferably a clean burning and commercially available fuel such as propane. A clean burning fuel is a fuel that does not contain large amounts of contaminants, the most important being sulfur. Natural gas, ethane, propane, butane, ethanol, methanol and liquefied petroleum gas ("LPG") are all clean burning fuels when the contaminants are limited to a few percent. One example of a commercially available propane fuel is HD-5, an industry grade defined by the Society of Automotive Engineers and available from Bernzomatic. Alternatively, the fuel may be any commercially available liquid fuel including diesel, gasoline, kerosene, methanol and ethanol. In accordance with an embodiment of the invention, and as discussed in more detail below, the Stirling engine 401 and burner 404 provide substantially complete combustion in order to provide high thermal efficiency as well as low emissions. The characteristics of high efficiency and low emissions are highly desired characteristics of a hybrid electric vehicle.

Controller 408 also controls the power output produced by the Stirling cycle engine 401 and generator 402. Generator 402 is coupled to a crankshaft (not shown) of Stirling engine 401. In an alternative embodiment, the external combustion engine 401 is a free piston Stirling engine and the generator is coupled mechanically to the pistons of the Stirling engine. The term "generator", as used in the specification and in any appended claims, unless context requires otherwise, will encompass the class of electric machines such as generators wherein mechanical energy is converted to electrical energy or motors wherein electrical energy is converted to mechanical energy. The generator 402 is preferably a permanent magnet brushless motor. An energy storage device 413 is coupled to the controller 408 and is used to provide power at various points during operation. For example, energy storage device 413 may be used to provide starting power for the personal transport vehicle 100 as well as direct current ("DC") or alternating current ("AC") power to a wheel motor. In a preferred embodiment, the energy storage device 413 is a rechargeable battery. In an alternative embodiment, the personal transport vehicle may include an AC outlet to provide power to an external load. An inverter 416 is coupled to the battery 413 in order to convert the DC power produced by battery 413 to AC power.

In the course of operation, Stirling engine 401 also produces heat from, for example, the exhaust gases of the burner 404 as well as the supply and extraction of heat from a working fluid. Accordingly, the excess heat produced by the Stirling engine 401 may be used to advantageously heat the atmosphere surrounding the personal vehicle or the user of the personal vehicle. In this manner, the Stirling engine may be used to provide both electrical power and heat for the vehicle.

Figure 5:
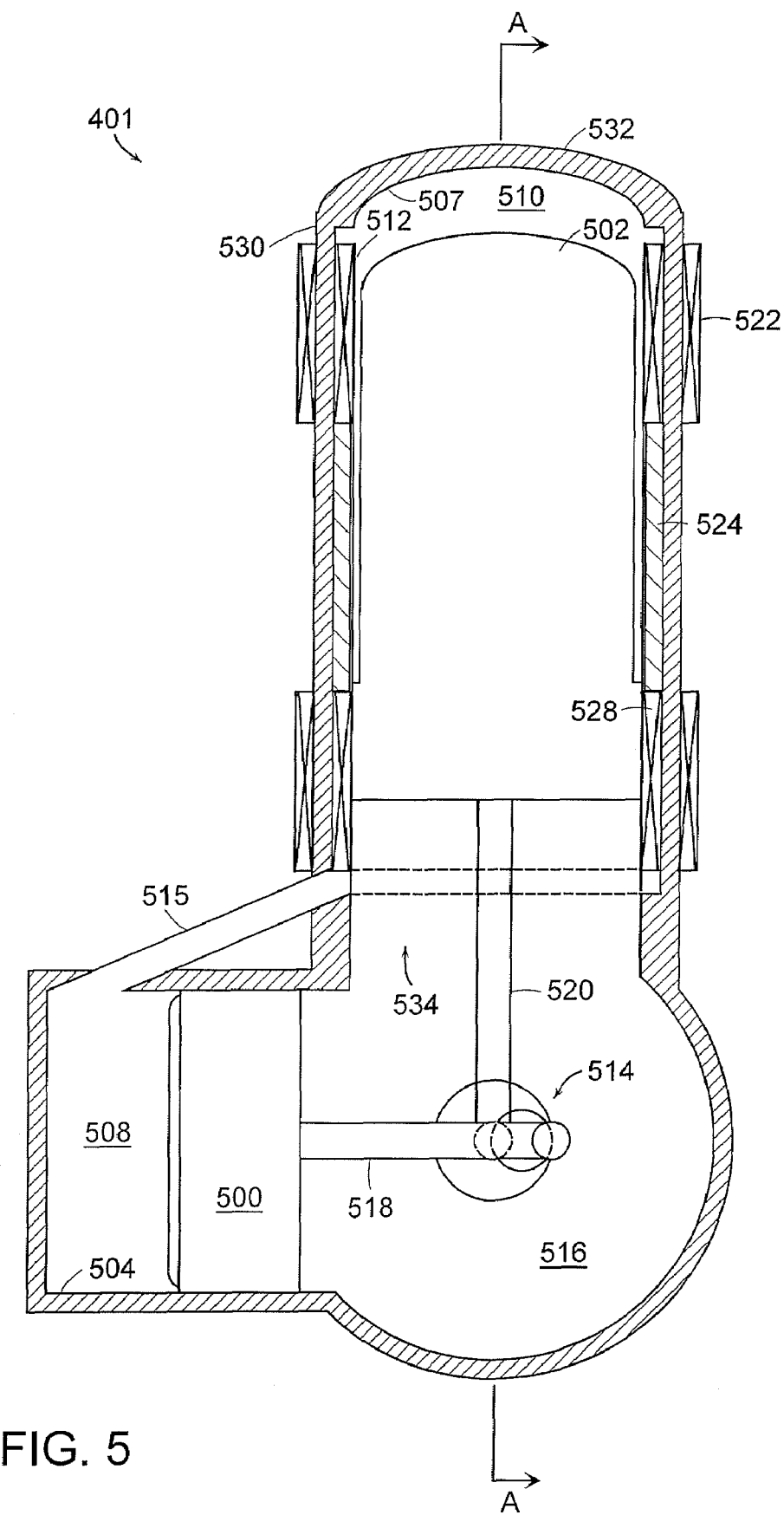
FIG. 5 is a cross section view of a Stirling cycle engine in accordance with a preferred embodiment of the invention.

The operation of Stirling cycle engine 401 will now be described in more detail with respect to FIG. 5 which is a cross-sectional view of a Stirling engine in accordance with an embodiment of the invention. The configuration of Stirling engine 401 shown in FIG. 5 is referred to as an alpha configuration, characterized in that a compression piston 500 and an expansion piston 502 undergo linear motion within respective and distinct cylinders: compression piston 500 in a compression cylinder 504 and expansion piston 502 in an expansion cylinder 507. The principle of operation of a Stirling engine configured in an "alpha" configuration and employing a first "compression" piston and a second "expansion" piston is described at length in U.S. Pat. No. 6,062,023 which is herein incorporated by reference. The alpha configuration is discussed by way of example only, and without limitation of the scope of any appended claims.

In addition to compression piston 500 and expansion piston 502, the main components of Stirling engine 401 include a burner (not shown), a heater heat exchanger 522, a regenerator 524, and a cooler heat exchanger 528. Compression piston 500 and expansion piston 502, referred to collectively as pistons, are constrained to move in reciprocating linear motion within respective volumes 508 and 510 defined laterally by compression cylinder 504 and expansion cylinder liner 512. The volumes of the cylinder interior proximate to the burner heat exchanger 522 and cooler heat exchanger 528 will be referred to, herein, as hot and cold sections, respectively of engine 401. The relative phase (the "phase angle") of the reciprocating linear motion of compression piston 500 and expansion piston 502 is governed by their respective coupling to drive mechanism 514 housed in crankcase 516. Drive mechanism 514 may be one of various mechanisms known in the art of engine design which may be employed to govern the relative timing of pistons and to interconvert linear and rotary motion. For additional information relating to a preferred drive mechanism 514, see U.S. Pat. No. 6,253,550, "Folded Guide Link Stirling Engine," which is incorporated herein by reference.

Compression piston 500 and expansion piston 502 are coupled, respectively, to drive mechanism 514 via a first connecting rod 518 and a second connecting rod 520. The volume of compression cylinder 508 is coupled to cooler heat exchanger 528 via duct 515 to allow cooling of compressed working fluid during the compression phase. Duct 515, more particularly, couples compression volume 508 to the annular heat exchangers comprising cooler heat exchanger 528, regenerator 524, and heater heat exchanger 522. The burner (not shown) combusts a fuel in order to provide heat to the heater heat exchanger 522 of a heater head 530 of the Stirling engine. The expansion cylinder and piston are disposed within a heater head 530 such that the working fluid in the expansion cylinder may be heated via the heater heat exchanger 522. For additional information relating to a preferred configuration of a burner, regenerator 524 and heater head 530, see U.S. Pat. No. 6,381,958, entitled "Stirling Engine Thermal System Improvements," which is incorporated herein by reference in its entirety.

Returning to FIG. 4, as mentioned, the Stirling cycle engine 401 and generator 402 may be disposed within a pressure vessel 418. The pressure vessel 418 contains a high pressure working fluid, preferably helium or nitrogen at 20 to 30 atmospheres pressure. The expansion cylinder and piston (shown in FIG. 5) of the Stirling engine 401 extend through the pressure vessel 418 and a cold collar (or cooler) 403. In an alternative embodiment, the cold collar may be disposed within the pressure vessel 418. The end of the expansion cylinder (including heater head 530) is contained within the burner 404. The cold collar 403 circulates a cooling fluid through cooling lines 406 and through radiator 407. The cooling fluid is pumped through the cold collar 403 by a cooling pump 405. A fan 411 may be used to force air past the radiator 407 thereby heating the air and cooling the cooling fluid. The heated air may then be forced through openings in the body of the personal vehicle to heat the surrounding area including the person on the personal vehicle. In alternative embodiments, the excess heat created by the combustion within burner 404 may be directly provided to the surrounding ambient air.

The pressure vessel 418 has a pass-through port for an electrical connection 419 between the generator 402 contained within the pressure vessel 418 and the controller 408. The controller 408 supplies power to cooling pump 405 and fan 411 through power supply lines 415. The controller 408 also controls the power output of the Stirling engine 401 and generator 402 as well as the charge level of the battery 413 by varying the speed and temperature of the Stirling engine. Controller 408 provides command signals to the burner 404 in order to control the temperature of the Stirling engine 401. Controller 408 also provides command signals to generator 402 in order to control the speed of the Stirling engine 401. In one embodiment, the controller 408 varies the temperature of the heater head of the Stirling engine to meet the power demands, while the engine is allowed to operate at speeds permitted by a simple rectifier. The temperature of the heater head may be controlled by varying the fuel flow. The temperature of the heater head, however, is subject to maximum temperature limits. Alternatively, the controller 408 varies the speed of the Stirling engine to meet the power demands, while the heater head temperature is held constant at the maximum allowed temperature. In other embodiments of the invention, the generator is disposed outside the pressure vessel and a sealed coupling between engine and generator is effected.

Figure 6A:
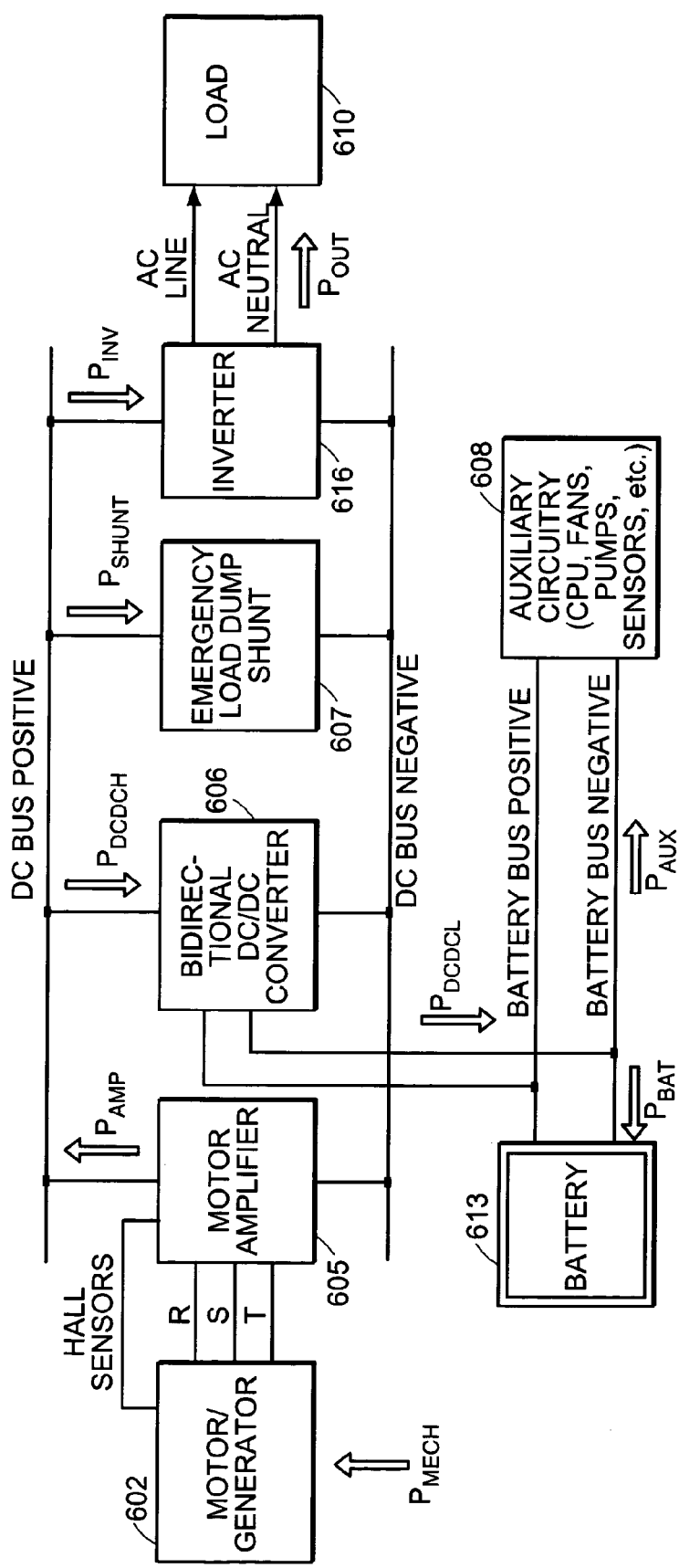
FIG. 6A is a schematic block diagram of the power control system for the engine of the personal vehicle of FIG. 1 in accordance with an embodiment of the invention

Preferably, the power output of generator 402 and Stirling engine 401 are controlled using controller 408 so as to maintain the optimal charge and voltage levels in the battery 413. Electrical loads (e.g., the motor used to propel the ground contacting members of the vehicle) will reduce the charge and voltage of the battery 413 causing the controller 408 to command additional power from the engine. FIG. 6A is a schematic block diagram of the power control system included in the controller 408 (shown in FIG. 4) in accordance with an embodiment of the invention. The power control system controls the speed and temperature of the Stirling engine in order to provide the necessary power to meet the demand (or load) placed on the Stirling engine and generator by the wheel motor of the scooter and maintaining the charge level of the battery. The power control system as shown in FIG. 6A includes a motor/generator 602, a motor-amplifier 605, and a battery 613.

As discussed above with respect to FIG. 4, the generator 602 is coupled to the crankshaft of a Stirling engine (not shown). The Stirling engine provides mechanical power ($P_{mech}$) to the generator 602 which in turn converts the mechanical power to three-phase electrical power. Generator 602 also, as discussed in more detail below, acts as an adjustable load on the engine in order to control the speed of the engine. Generator 602 delivers the three-phase electrical power to motor-amplifier 605. Motor-amplifier 605 transfers electrical power produced by the motor generator 602 to a high voltage DC bus ($P_{amp}$). The power provided to the high voltage DC bus ($P_{amp}$) is delivered to a DC to DC converter 606 ($P_{dcdch}$) which steps down the power to a low voltage DC bus for delivery to the battery 613 ($P_{bat}$). The DC to DC converter 606 may also be used to step up the power to the high voltage DC bus used for power control and AC power conversion. Alternate embodiments may omit the DC to DC converter and connect the high voltage DC bus directly to the battery 613. Battery 613 is used to start the Stirling engine and to provide power to auxiliary circuitry 608 of the APU such as fans, pumps, etc., as well as to provide output power when the load on the APU exceeds the power produced by the motor/generator 602. In addition, the battery 613 provides power to the vehicle, while the engine is warming up, thereby allowing immediate operation of the vehicle. As described further below, battery 613 acts as an energy reservoir during the operation of the personal vehicle.

An emergency shunt 607 may be used to remove excess power from the high voltage DC bus in the case of an over-voltage condition in either DC bus. In one embodiment, the emergency shunt resistors are located in the water of the radiator 108 (shown in FIG. 1). In this manner, the excess heat produced by the shunt resistors when they are utilized to remove excess power, is advantageously absorbed by the same system used to dissipate the excess heat of the personal vehicle (i.e., radiator 108). Alternatively, the emergency shunt may be located on the frame of the vehicle or in the open air. An inverter 616 is used to deliver AC power ($P_{out}$) to a load 610. The inverter 616 draws power ($P_{inv}$) from the DC bus.

The charge level of the battery 613 reflects changes in the load 610 over time (e.g., the requirements of the motor used to propel the vehicle). In order to provide the required power output, the power control system of FIG. 6A attempts to keep the battery 613 at its optimum charge, without overcharging, in response to changes in the output load 610. The optimum charge is not necessarily a full charge and may be 80-100% of the full charge. The optimum charge is a tradeoff between keeping the battery ready for extended periods of discharge and increasing the battery cycle life. Charging the battery to nearly 100% of full charge maximizes the availability of the battery for extended periods of discharge but also stresses the battery, resulting in a shorter battery cycle life. Charging the battery to less than full charge reduces the stresses placed on the battery and thereby extends the battery cycle life but also reduces the energy available in the battery for sudden load changes. The selection of the optimum charge will depend on the expected load variations of the personal vehicle and the battery capacity and is well within the scope of one of ordinary skill in the power management art. In a preferred embodiment, the optimum charge is set at 90% of full charge. In another embodiment, the battery may be brought to above 100% of its theoretical charge capacity to extend the life of certain types of batteries, such as lead-acid batteries. Another goal of the power control system is to reduce the fuel consumption of the engine by maximizing the efficiency from fuel input to power output. The power control system of FIG. 6A adjusts the engine temperature and the engine speed in order to produce the desired battery charge and thus, the required power output.

The charge of the battery 613 may be roughly estimated by the battery voltage which is roughly related to the battery charge. Monitoring only the battery voltage provides a simpler and cheaper method to determine the battery charge. As described above, differences between the load power ($P_{out}$) and the power generated by the Stirling engine ($P_{mech}$ or $P_{amp}$) will result in power flow to or from the battery 613. For example, if the engine does not produce enough power to meet the demand of the load 610, the battery 613 will provide the remaining power necessary to support the load 610. If the engine produces more power than required to meet the demand of the load 610, the excess power may be used to charge the battery 613. The power control system determines whether it is necessary to command the engine to produce more or less power in response to changes in the load. The engine speed and engine temperature are then adjusted accordingly to produce the required power. When the battery 613 is being discharged (i.e. the demand from the load 610 is greater than the power produced by the engine for extended periods of time), the engine temperature and speed are adjusted so that the engine produces more power. Typically, the engine temperature and speed are increased in order to produce more power. Preferably, when more power is needed, raising engine temperature is given preference over raising engine speed. Conversely, when the battery 613 is being charged for extended periods of time (i.e., the engine is producing more power than the load 610 demands), the engine temperature and speed are decreased to decrease the amount of power produced by the engine. Typically, the engine temperature and speed are adjusted to decrease the amount of power produced by the engine. Preferably, when less power is needed, reducing engine speed is given preference over reducing engine temperature.

Once the power control system determines the desired engine temperature and speed based on the desired battery power, the power control system sends a temperature command to the controller 109 (shown in FIG. 1) indicating the desired engine temperature and a speed command to the generator 602 indicating the desired engine speed. As mentioned above, the speed of the engine may be controlled by modulating the torque applied to the crankshaft of the engine by the motor/generator 602 using the motor amplifier 605. As such, the generator 602 acts as an adjustable load on the engine. When the generator 602 increases demand on the engine, the load on the crankshaft increases and thereby slows down the speed of the engine. The motor amplifier 605 adjusts the motor current in order to obtain the necessary torque in the motor and accordingly the necessary engine speed.

A Stirling cycle engine (or other external combustion engine) typically has a long response time to sudden changes in the load (i.e., there is a time lag between the engine's receipt of an increase or decrease temperature command and the engine reaching the desired temperature). The power control system, therefore, is designed to account for the lengthy response time of a Stirling cycle engine. For a sudden increase in the load 610, the torque load applied by the generator 602 on the crankshaft of the engine is reduced, thereby allowing the crankshaft to speed up and temporarily maintain an increased power output of the generator 602 until an increased temperature command sent to the controller 109 (shown in FIG. 1) takes effect. For a sudden load decrease, the torque applied by the generator 602 on the crankshaft of the engine may be increased in order to slow down the crankshaft and decrease the power output until a decreased temperature command sent to the burner control unit takes effect. The excess charge or power produced by the generator 602 may be used to charge the battery 613. As discussed above, any further excess electrical energy may also be directed to the emergency shunt 607. The process of controlling the temperature of the engine using the controller 109 is described in more detail below with respect to FIGS. 8-11c.

Figure 6B:
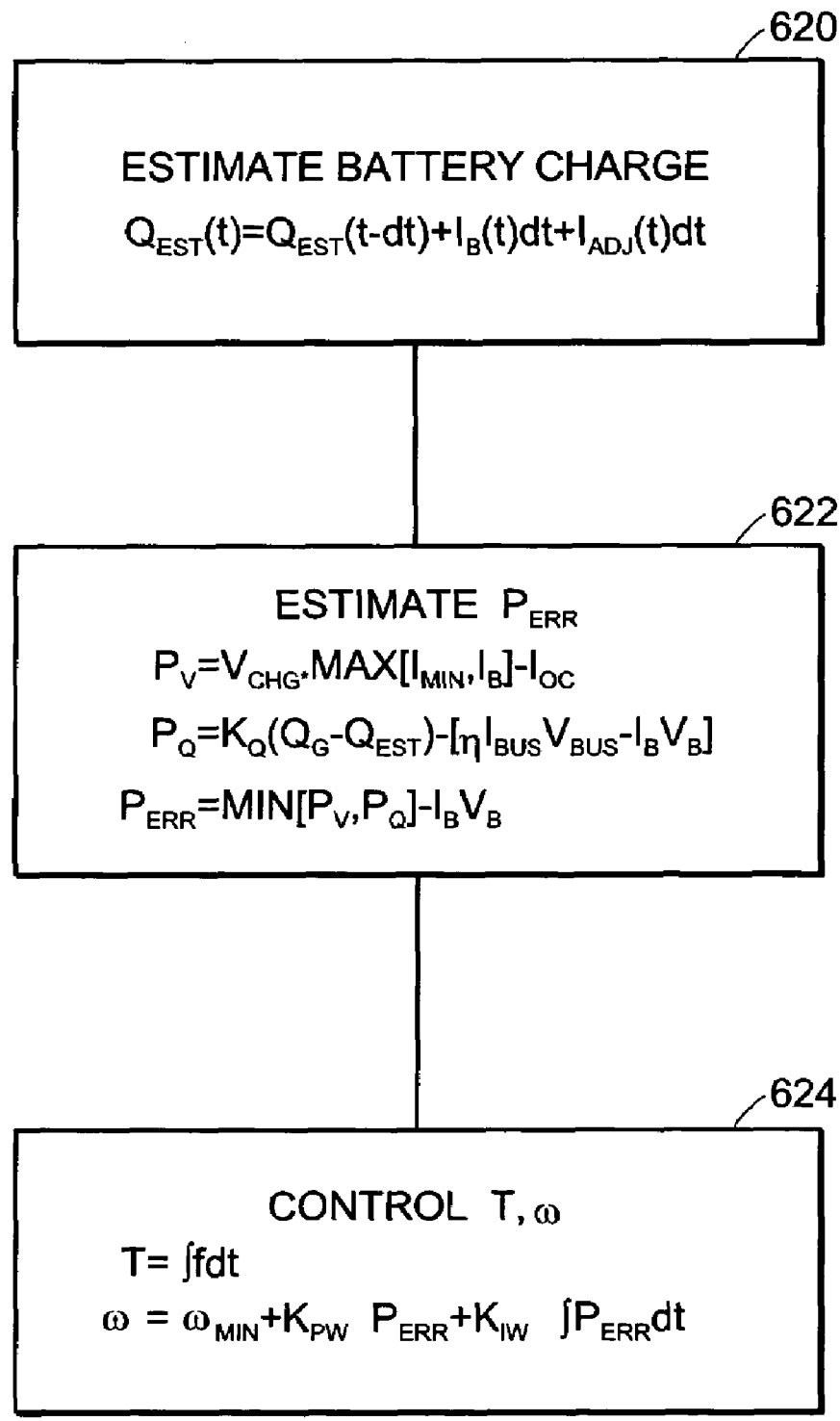
FIG. 6B is a schematic block diagram of a method of control for the power control system of FIG. 6A in accordance with an embodiment of the invention.

FIG. 6B is a schematic block diagram of a method for determining the desired engine temperature and speed in order to provide the required electrical power to maintain the optimal charge for the battery and meet the applied load. First, at block 620, the power control system estimates the state of charge of the battery. The estimated battery state of charge ($Q_{est}$) is determined using the measured battery current ($I_B$) as well as, when necessary, an adjustment current ($I_{adj}$) as shown in the following equation:

$$Q_{est}(t) = Q_{est}(t-dt) + I_B(t)dt + I_{adj}(t)dt, \quad \text{(Eqn. 1)}$$

in block 620. When the engine is first started, the initial estimated state of charge ($Q_{est}$) is set to a preselected value. In a preferred embodiment, the initial state of charge value is 10% of full charge. The adjustment current is then used to correct the battery current such that $Q_{est}$ approaches a value near the actual state of charge. By selecting a low initial value for $Q_{est}$ at startup, faster correction is achieved because a lower value for $Q_{est}$ allows for a higher charging current.

The adjustment current may be selected based on the known V-I characteristics of the battery. In a preferred embodiment, the battery is a lead-acid battery. The determination of the V-I plane for a particular battery is well within the scope of one of ordinary skill in the art. The V-I plane for the battery 613 (shown in FIG. 6A) may be divided into operating regions where the state of the charge of the battery is reasonably known. The measured battery voltage, $V_B$, and battery current, $I_B$, are used to identify the to current state of the battery in the V-I plane. The estimated charge $Q_{est}$ is then compared to the identified state of charge corresponding to the region of the V-I plane in which the measured battery voltage and current fall. The adjustment current, $I_{adj}$, is estimated by taking the product of a constant, which is a function of the measured voltage and current of the battery, and the difference between the estimated state of charge $Q_{est}$ and the state of charge estimated using the V-I plane and the measured battery voltage and current.

At block 622, a power error $P_{err}$ is determined by comparing the desired battery power $P_{batdes}$ and the actual battery power $P_B$. The power error $P_{err}$ is indicative of whether the APU must produce more or less power output. The actual battery power $P_B$ is the measured battery power flowing into the battery ($I_B V_B$). The desired battery power may be estimated using two methods. The first method is based on the charging voltage of the battery $V_{chg}$ and the second method is based on the estimated state of charge $Q_{est}$ of the battery. In the following discussion, the desired battery power estimated using the first method will be referred to as $P_V$ and the desired battery power estimated using the second method will be referred to as $P_Q$.

The first method estimates a desired battery power, $P_V$, using the charging voltage of the battery ($V_{chg}$). In a preferred embodiment, $P_V$ is estimated using the following equation:

$$P_V = V_{chg} * \text{MAX}[I_{min}, I_B] - I_{OC}, \quad \text{(Eqn. 2).}$$

The charging voltage $V_{chg}$ is the optimum battery voltage to keep the battery charged and is typically specified by the manufacturer of a particular battery. For example, in a preferred embodiment, the lead-acid battery has a charging voltage of 2.45V/cell. $V_{chg}$ is multiplied by the larger of either the measured battery current ($I_B$) or a predetermined minimum current value ($I_{min}$). $I_{min}$ may be selected based on the known characteristics of the V-I plane of the battery. For example, in one embodiment, when the measured battery voltage $V_B$ is much less than $V_{chg}$, $I_{min}$ may be set to a high value in order to quickly increase the voltage of the battery, $V_B$, up to $V_{chg}$. If $V_B$ is near $V_{chg}$, $I_{min}$ may be set to a low value as it will not require as much additional energy to bring the battery voltage $V_B$ up to $V_{chg}$. If $V_B$ is greater than $V_{chg}$, however, an overcharge current $I_{OC}$ may be subtracted from the greater of $I_B$ and $I_{min}$ in order to avoid an overvoltage condition.

The second method estimates a desired battery power $P_Q$ based on the estimated state of charge ($Q_{est}$) of the battery (as determined in block 620). In a preferred embodiment, $P_Q$ is estimated using the following equation:

$$P_Q = K_Q(Q_G - Q_{est}) - (\eta I_{bus} V_{bus} - I_B V_B), \quad \text{(Eqn. 3)}$$

where:
- $K_Q$ is a gain constant that may be configured, either in design of the system or in real-time, on the basis of current operating mode and operating conditions as well as the preference of the user;
- $Q_G$ is the desired state of charge of the battery;
- $I_{bus}$ is the measured bus current exiting the motor amplifier;
- $V_{bus}$ is the measured bus voltage; and
- $\eta$ is an estimated efficiency factor for the DC/DC converter (shown in FIG. 4A) between the motor amplifier and the battery.

The desired power $P_Q$ is based on the difference between the desired charged state $Q_G$ of the battery and the estimated charge state $Q_{est}$ of the battery. $Q_G$ is a predetermined value between 0 (fully discharged) and 1 (fully charged) and represents the state of charge the controller is trying to maintain in the battery. In a preferred embodiment, the desired state of charge of the battery is 90% of full charge. The farther away the estimated battery charge $Q_{est}$ is from the desired charge state $Q_G$, the more power which can safely be requested to charge the battery. The closer $Q_{est}$ is to $Q_G$, the less power that is needed to bring the battery voltage, $V_B$, up to $V_{chg}$.

The estimation of the desired battery power $P_Q$ is also adjusted to account for possible load changes. If the load on the Stirling engine and generator were suddenly decreased, the excess power produced by the engine must be directed elsewhere until the amount of power generated by the engine may be reduced (i.e., the system has time to react to the sudden change in load). The excess power represents the worst case additional power that could flow into the battery if the load were suddenly removed from the system. Accordingly, it is desirable to select a desired battery power which leaves room in the battery to absorb the excess power produced by a change in the load. The excess power is subtracted from $P_Q$ in order to leave additional room in the battery to absorb the excess power. The excess power may be determined by comparing the power generated by the engine to the power entering the battery and is represented by the term $\eta I_{bus}V_{bus}-I_BV_B$ in Eqn. 3 above. The power generated by the engine is estimated using the bus voltage $V_{bus}$ measured at the motor amplifier and the bus current $I_{bus}$ measured exiting the motor amplifier. The power entering the battery is the product of the measured battery voltage and current ($I_BV_B$).

At block 622, the minimum of the two estimated desired battery powers $P_V$ and $P_Q$ is used to determine the power error $P_{err}$. The power error $P_{err}$ is the difference between the selected desired battery power and the measured power flowing into the battery as shown by the following equation:

$$P_{err}=\text{MIN}[P_V, P_Q]-I_BV_B, \qquad (\text{Eqn. 4})$$

The measured power $P_B$ flowing into the battery is the product of the measured battery current $I_B$ and the measured battery voltage $V_B$. As mentioned above, the power error $P_{err}$ is indicative of whether the APU must produce more or less power output. In other words, if the actual battery power is less than the desired battery power, the APU will need to produce more power (i.e., increase speed and temperature). If the actual battery voltage is greater than the desired battery voltage, the APU will need to produce less power (i.e., decrease speed and temperature).

In response to the power error signal $P_{err}$, the power control system produces an engine temperature command signal output (T) and an engine speed command signal output ($\omega$) at block 624 which indicate the engine temperature and speed required to produce the desired power. In a preferred embodiment, the engine temperature T is proportional to the engine speed and the integral of a function of $P_{err}$. In this embodiment, T is governed by the control law $$T=\int f dt, \qquad (\text{Eqn 5})$$

where:
- $f=K_{it}P_{err}$ when $\omega_{mot}<\omega_{motidle}$;
- $f=K_{it}P_{err}+K_{drift}$ when $P_{err}\geq 0$ and $\omega_{mot}\geq\omega_{motidle}$; and
- $f=K_{drift}$ when $P_{err}<0$ and $\omega_{mot}>\omega_{motidle}$.

In the above control law, $\omega_{mot}$ is the measured engine speed, $\omega_{motidle}$ is a predetermined nominal engine speed, and $K_{it}$ is a gain constant. When the speed of the engine is greater than a nominal motor speed, an additional drift term ($K_{drift}$) is added which has the effect of slowly increasing the engine temperature as well as indirectly decreasing the engine speed to the nominal speed of the engine. Operation of the engine at the nominal engine speed maximizes the efficiency of the engine.

In a preferred embodiment, the speed of the engine ($\omega$) is proportional to the power error $P_{err}$ and the integral of $P_{err}$ and is governed by the following control law:

$$\omega=\omega_{min}+K_{pw}P_{err}+K_{iw}\int P_{err}dt \qquad (\text{Eqn. 6})$$

where:
- $\omega_{min}$ represents the minimum allowable engine speed; and
- $K_{pw}$ and $K_{iw}$ are gain constants.

The motor speed, $\omega$, is limited to be at least some minimum speed $\omega_{min}$. The engine speed is also limited to a maximum speed $\omega_{max}$ to reduce the engine cooling effect when the speed increases.

Figure 7:
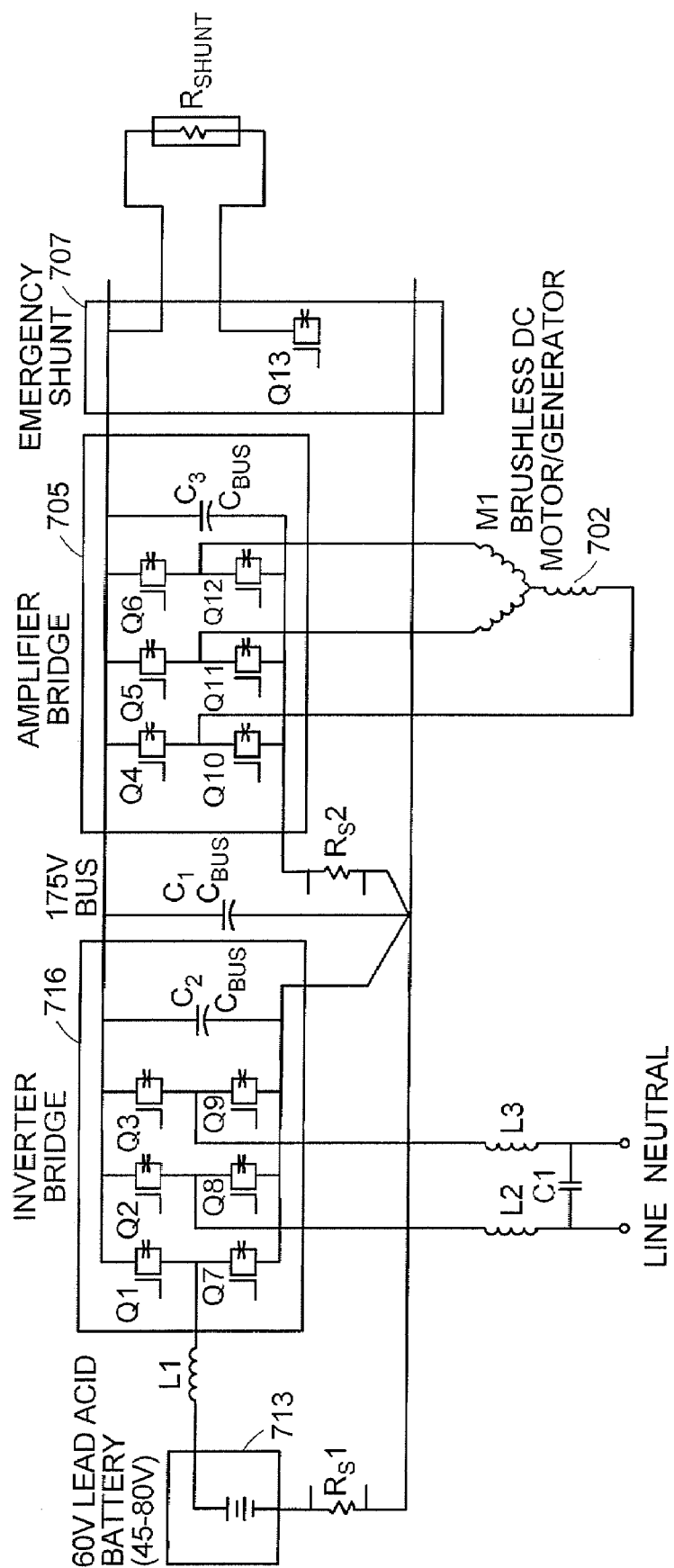
FIG. 7 illustrates the circuitry for the power control system in FIG. 6A in accordance with an embodiment of the invention.

FIG. 7 shows the structural details of the power electronics circuitry of FIG. 6A. The generator 702 is coupled to a battery 713, an inverter 716, an amplifier 705 and an emergency shunt 707. The behavior of these elements is similar to that described above with respect to FIGS. 6A and 6B.

As discussed above with respect to FIGS. 6A and 6B, once the power control system determines the desired engine temperature and speed required to maintain the optimal charge level of the battery, a speed command ($\omega$) is sent to the generator 602 (shown in FIG. 6A) indicating the desired engine speed and a temperature command (T) is sent to the controller 109 (shown in FIG. 1) indicating the desired engine temperature. Returning to FIG. 4, the controller 408 controls the burner 404 to achieve the desired engine temperature. The controller 408 delivers a clean burning fuel, preferably propane, supplied from a fuel supply 410 to the burner 404. The controller 408 also delivers a measured amount of air to the burner 404 to ensure substantially complete combustion of the fuel. The controller 408 sets the fuel and air flow rates to provide the required engine temperature and to minimize emissions.

Preferred methods of improving thermal efficiency and providing low emissions of Stirling engine 401 will now be discussed in more detail in reference to FIGS. 8-11. Components of such thermal efficiency include efficient pumping of an oxidant (typically air, and, referred to herein as "air") through the burner 404 to provide combustion, and the recovery of hot exhaust leaving the heater head 530 (shown in FIG. 5) of the Stirling engine. In many applications, air (or other oxidant) is pre-heated, prior to combustion, nearly to the temperature of the heater head 530, so as to achieve thermal efficiency. There is still a considerable amount of energy left in the combustion gases after the heater head of the Stirling engine has been heated, and, as known to persons skilled in the art, a heat exchanger may be used to transfer heat from the exhaust gases to the combustion air prior to introduction into burner 404. A preheater assembly is discussed in more detail below with respect to FIG. 10.

In addition, minimizing emissions of carbon monoxide (CO), hydrocarbons (HC) and oxides of nitrogen (NOx) requires a lean fuel-air mixture which still achieves complete combustion. A lean fuel air mixture has more air than a stoichiometric mixture (i.e., 15.67 grams of air per gram of propane, for example). As more air is added to the fuel, the emissions of CO, HC and NOx decrease until the amount of air is large enough that the flame becomes unstable. At this point, pockets of the fuel-air mixture will pass through the burner without complete combustion. Incomplete combustion of the fuel-air mixture produces large amounts of CO and HC. The CO and HC emissions will continue to increase as more air is added to the fuel-air mixture until the flame extinguishes at a Lean Blow-Out limit ("LBO"). The LBO will increase as the temperature of the incoming air (i.e., the preheated air) increases. As a result, the optimal fuel-air ratio decreases as the temperature of the preheated air increases during the warmup phase of the engine. Once the engine is warmed up, the fuel-air ratio is adjusted to minimize the emissions produced and to maintain a stable flame. As used in this description and the following claims, a fuel-air ratio is the ratio of the mass of the fuel to the mass of the air flowing into the combustion chamber of the burner.

Accordingly, the fuel-air ratio is first controlled by the controller (shown in FIGS. 1 and 4) to provide the optimal fuel-air ratio for ignition. Once the flame is proved, the fuel-air ratio is controlled to minimize emissions based upon the temperature of the preheated air and the fuel type. The controller then controls the fuel flow rate to bring the heater head 530 temperature up to the commanded temperature. The air flow rate is adjusted in order to maintain a desired level of oxygen in the exhaust of the engine as the fuel flow rate changes and as the air preheat temperature changes.

Figure 8:
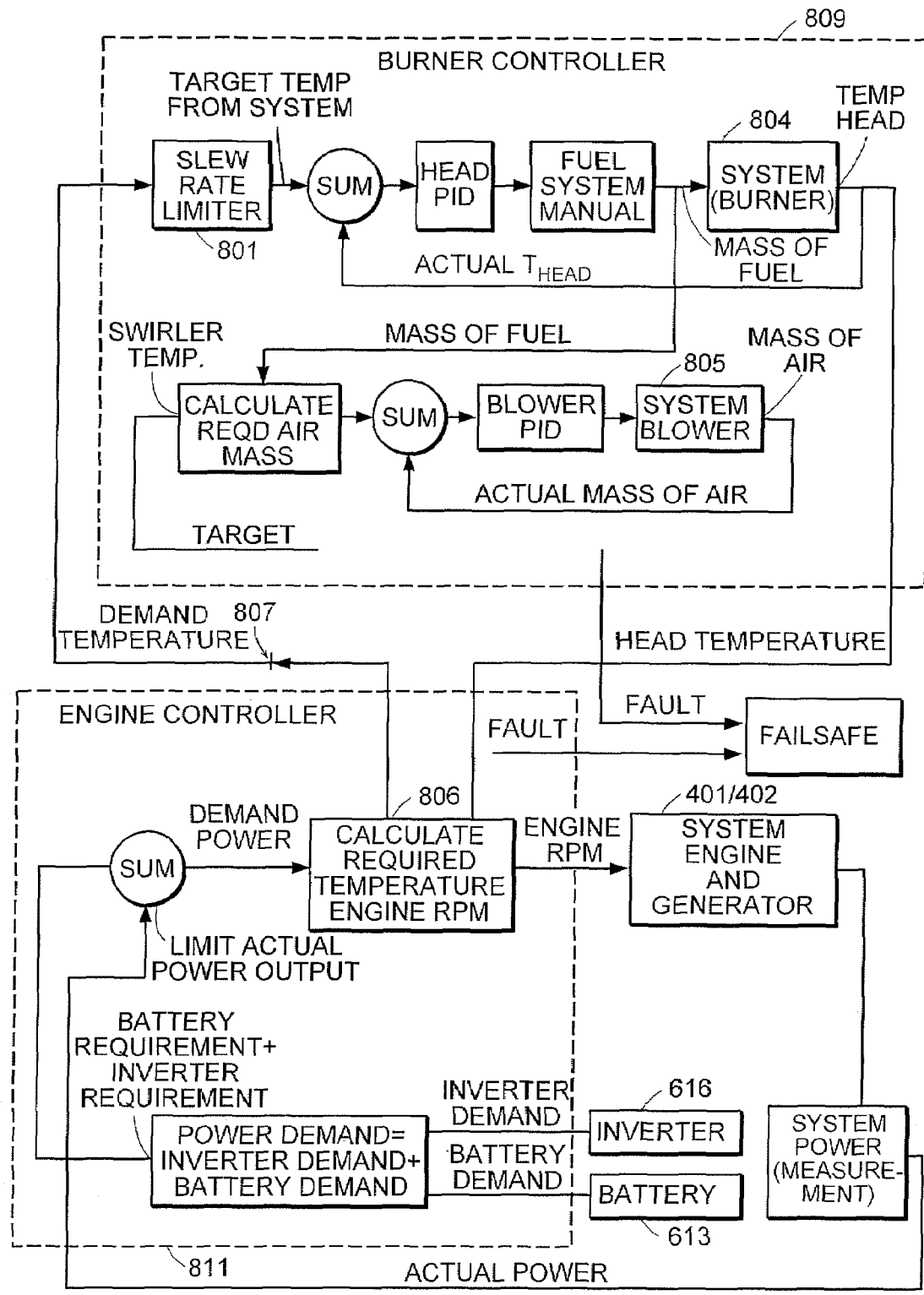
FIG. 8 is a schematic block diagram of the power control system of the personal vehicle of FIG. 1 including a burner controller in accordance with an embodiment of the invention.

FIG. 8 is a schematic block diagram of the power control system including the burner controller 809 and an engine controller 811. Engine controller 811 calculates the required engine temperature and engine speed at block 806 as discussed above with respect to FIGS. 6A and 6B. The desired engine temperature (i.e. the desired temperature of the heater head) is provided as a temperature command input 807 to the burner controller 809. A slew rate limiter 801 is advantageously used to limit the increase in engine temperature so that the temperature increase is gradual in order to minimize temperature over- and under-shoot. Upon receiving a temperature command 807 from the engine controller 811 for an engine temperature above a minimum operating temperature, the burner controller 809 initiates a lighting sequence for the burner 804. A water pump (not shown) and a radiator fan (not shown) are controlled to maintain the temperature of the coolant.

A given fuel will only ignite over a limited range of fuel-air ratios. At ignition, an ignition fuel-air ratio chosen which is equal to or less than the stoichiometric fuel-air ratio corresponding to the fuel being used. In a preferred embodiment, where the fuel is propane, the ignition fuel-air ratio is set to 0.1 grams propane per grams air. The ignition fuel air ratio is maintained until the flame stabilizes and the temperature of the interior of the combustion chamber of the burner 804 increases to a warmup temperature. In a preferred embodiment, the ignition fuel-air ratio is maintained until the heater head 530 temperature reaches 300° C.

Once the flame is stabilized, and the temperature of the combustion chamber of the burner reaches the desired warmup temperature, the fuel-air ratio is then controlled based on the air preheat temperature and the fuel type. As described above, the optimal fuel-air ratio of the fuel-air mixture decreases as the temperature of the preheated air increases. The optimal fuel-air ratio first decreases linearly from a "start" fuel-air ratio for room temperature air to a "run" fuel-air ratio, for warmed up preheated air temperature. The air is considered fully warmed up when it exceeds its known ignition temperature. For example, the ignition temperature for propane is 490° C. In a preferred embodiment, where the fuel is propane, the "start" fuel-air ratio is 0.052 grams fuel to gram air, which results in approximately 4% oxygen in the exhaust of the engine. The "run" fuel-air ratio in the preferred embodiment is 0.026 grams fuel to gram air, which results in approximately 13% oxygen in the exhaust of the engine. Once the air reaches its warmed up preheated temperature, the air flow rate is adjusted to maintain the optimal fuel-air ratio for the warmed up preheated temperature. The air flow rate may be adjusted, for example, in response to a change in the fuel flow rate or a change in the air preheat temperature.

Figure 9:
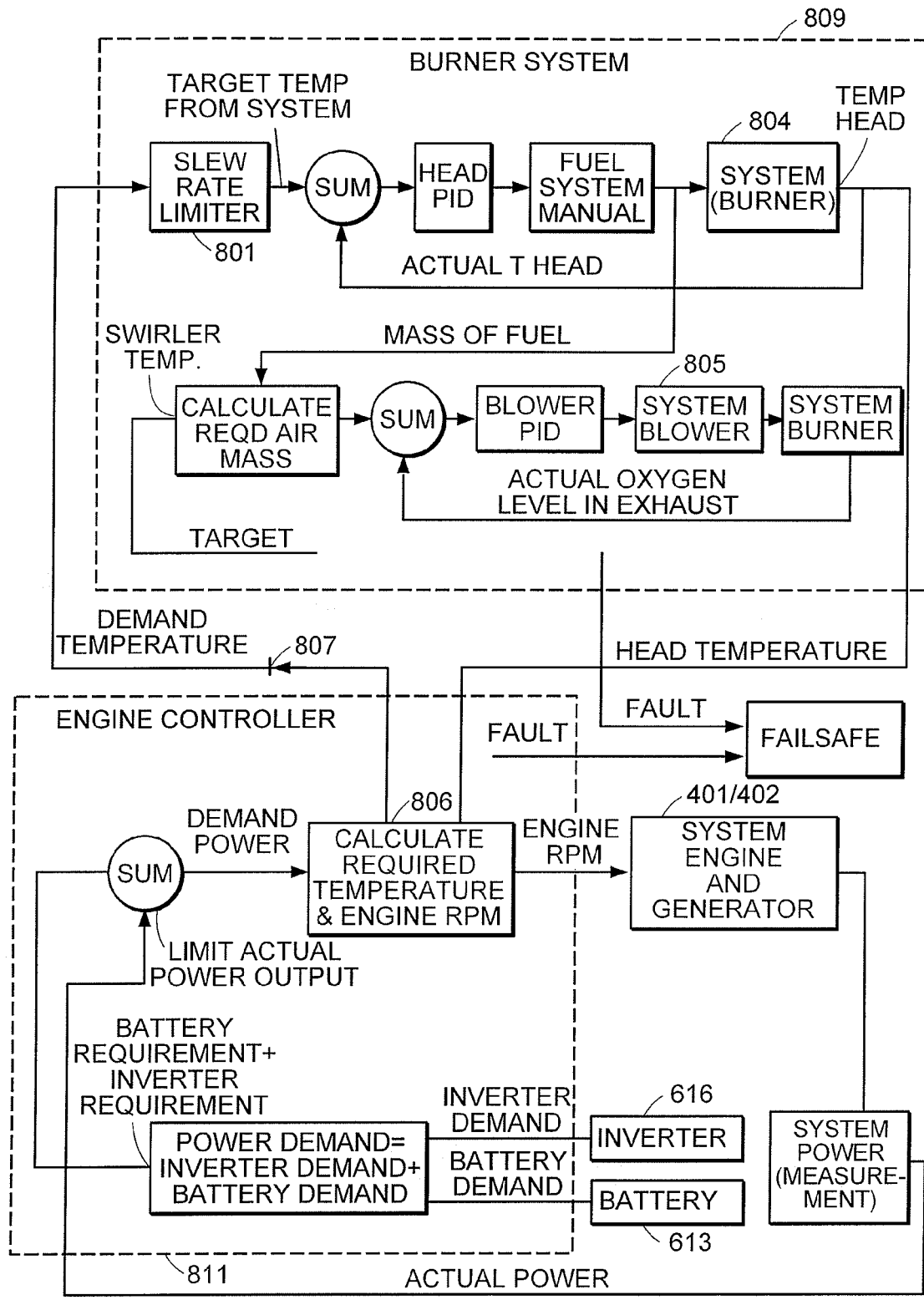
FIG. 9 is a schematic block diagram of the power control system of the personal vehicle of FIG. 1 including a burner controller in accordance with an alternative embodiment of the invention.

In the embodiment of FIG. 8, the fuel-air ratio may be determined by measuring the air and fuel mass flow rates. The air flow rate may be measured with a pressure sensor and a venturi tube at the blower 805. The fuel flow rate may be determined from the pressure upstream and downstream of a set of fuel control valves and monitoring which valves are currently commanded open. In an alternative embodiment, the fuel-air ratio may be based on the measurement of the oxygen content in the exhaust of the APU as shown in FIG. 9. An oxygen sensor may be placed in the engine to sample the exhaust gas and measure the percentage of oxygen in the exhaust.

Returning to FIG. 8, the engine temperature ($T_{head}$) is measured and compared to the desired engine temperature 807 using a feed back loop. The engine temperature will continue to be increased (by increasing the fuel and air flow rates) until the engine temperature reaches the desired engine temperature. As discussed previously, the slew rate limiter 801 provides a gradual increase in the temperature to minimize temperature over- and under-shoot. When the engine controller 811 commands a heater head temperature below a minimum heater head temperature, the burner controller 809 turns off the fuel and air and controls the water pump and radiator fan to avoid coolant boil-over.

In addition to providing the optimal fuel-air ratio, the fuel and air combusted in burner 804 must be well-mixed with sufficient amounts of oxygen to limit the emission of carbon monoxide (CO) and hydrocarbon (HC) and, additionally, must be burned at low enough flame temperatures to limit the formation of oxides of nitrogen ($NO_x$). The high temperature of pre-heated air, which as described above is desirable for achieving high thermal efficiency, complicates achieving low emission goals by making it difficult to premix the fuel and air and requiring large amounts of excess air in order to limit the flame temperature. As used herein, the term "auto-ignition temperature" is defined as the temperature at which a fuel will ignite without a temperature-decreasing catalyst under existing conditions of air and fuel pressure. The typical preheated air temperature exceeds the auto-ignition temperature of most fuels, potentially causing the fuel air mixture to ignite before entering the combustion chamber of the burner. One solution to this problem is to use a non-pre-mixed diffusion flame. However, since such diffusion flames are not well mixed, higher than desirable emissions of CO and NOx result. A detailed discussion of flame dynamics is provided by Turns, *An Introduction to Combustion: Concepts and Applications*, (McGraw-Hill, 1996), which is incorporated herein by reference. An increased air flow provided to limit flame temperature typically increases the power consumed by an air pump or blower, thereby degrading overall engine efficiency.

In accordance with an embodiment of the present invention, low emissions and high efficiency may be provided by producing a pre-mixed flame even in the presence of air heated above the auto-ignition temperature of the fuel, and additionally, by minimizing the pressure drop between the air inlet and the flame region thereby minimizing blower power consumption.

The term "flame speed" is defined as the speed at which a flame front will propagate through a particular fuel-air mixture. Within the specification and the following claims, the term "combustion axis" shall refer to the direction of predominant fluid flow upon combustion of the fluid.

Figure 10A:
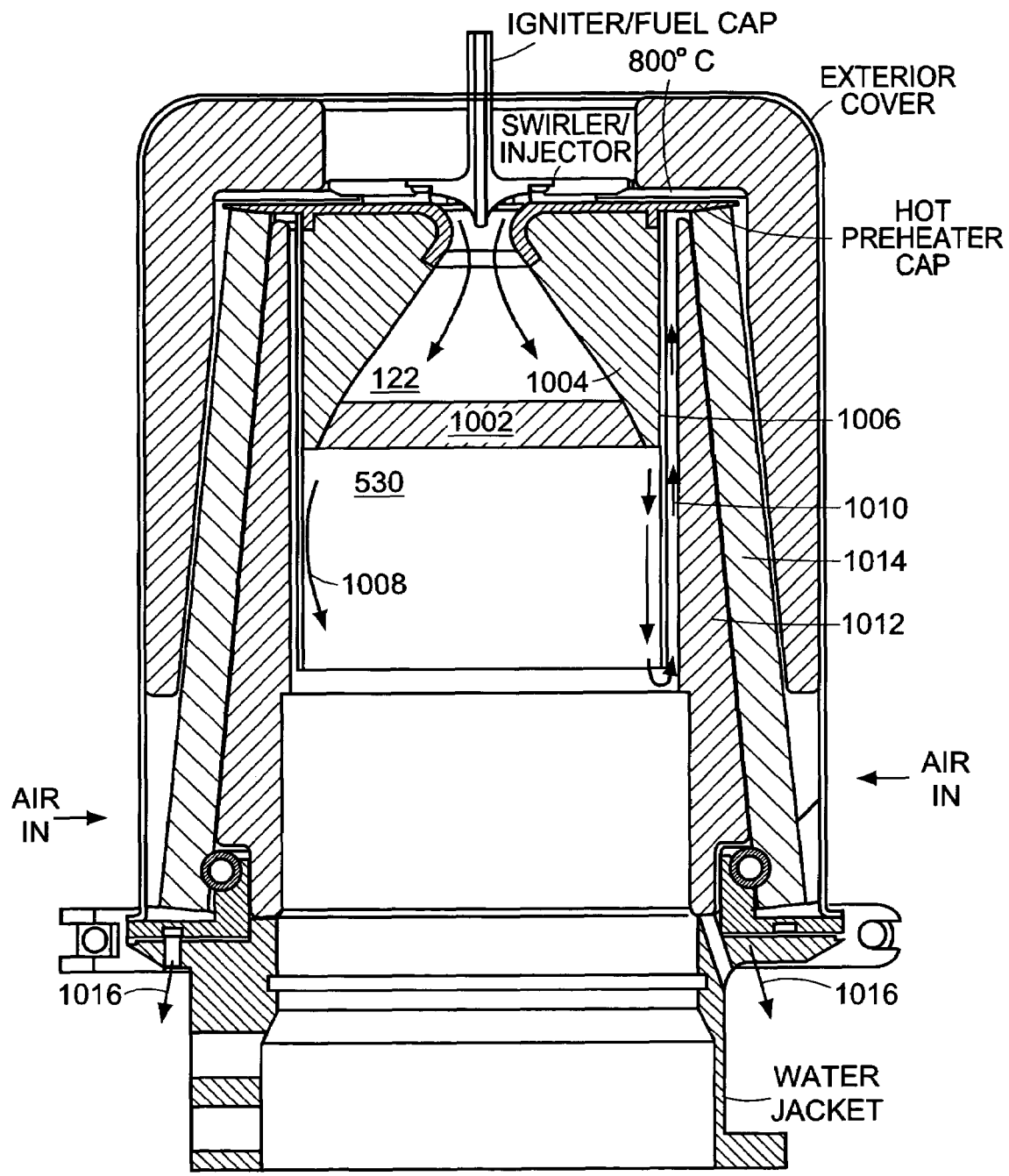
FIG. 10a is a side view in cross section of the burner and exhaust heat recovery assembly, in accordance with an embodiment of the invention.

Typical components of the burner and preheater assemblies, in accordance with embodiments of the present invention, are described with reference to FIG. 10a. The target range for combustion gases is 1700-2300K, with a preferred range of 1900-1950K. Operating temperatures are limited by the strength of heater head 530 which must contain working fluid at an operating pressure of typically several atmospheres and by the oxidation resistance of the burner structure. Since the strength and oxidation resistance of metals typically decreases at high temperatures, it is important to shield metal components from the high combustion temperatures. To that end, burner 122 is surrounded by a ceramic combustion chamber 1004, itself encased in a metal combustion chamber liner 1006, thermally sunk to heater head 530 and cooled by incoming air from the preheater path or by exhaust gases 1010. Additionally, heater head 530 is shielded from direct flame heating by head flame cap 1002. The exhaust products of the combustion process follow path 1008 past heater head 530 through a channel providing for efficient transfer of heat to the heater head and to the working gas contained within the heater head.

Figure 10B:
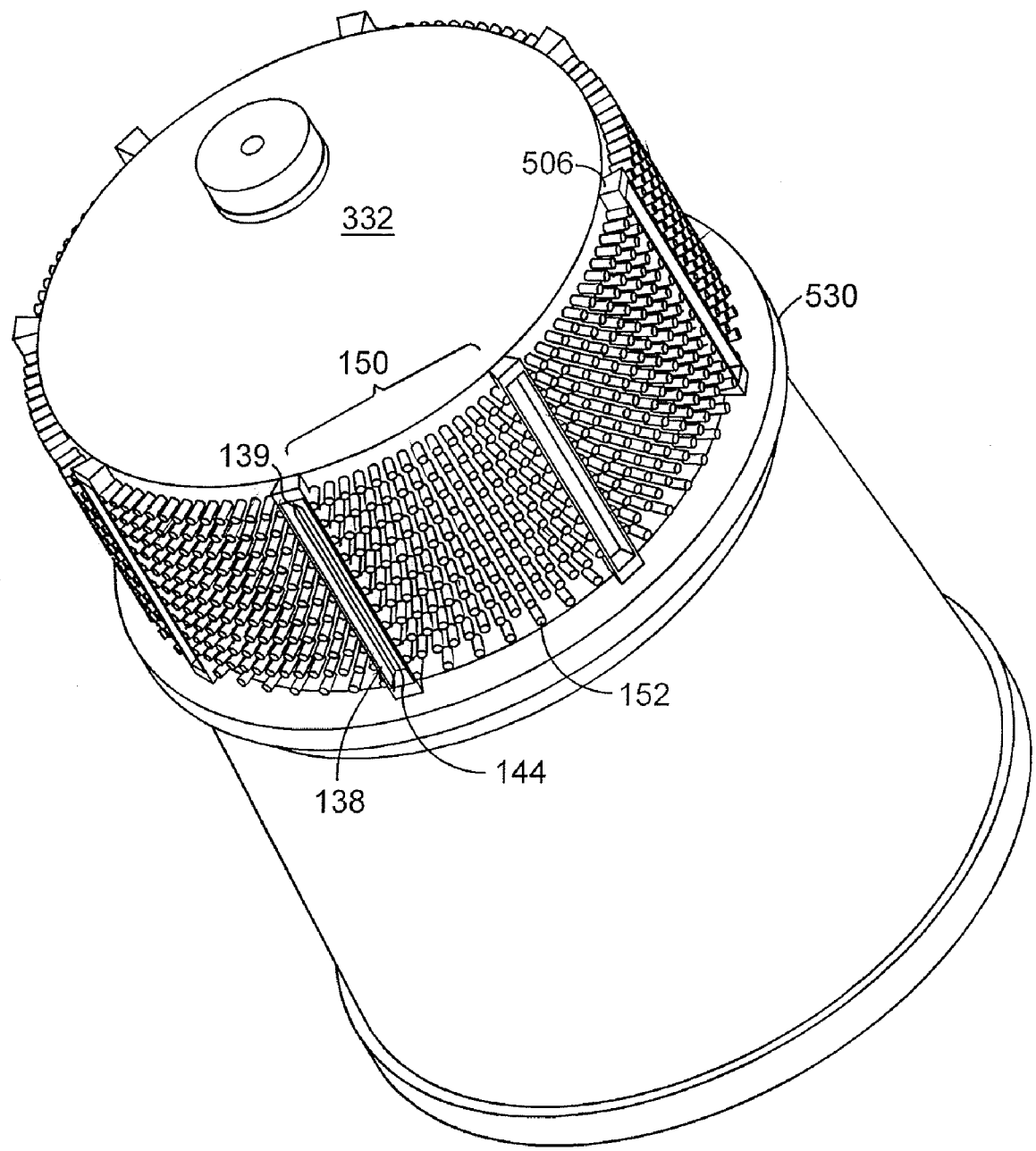
FIG. 10b shows a perspective top view of a heater head including heat transfer pin arrays in accordance with an embodiment of the invention.

The overall efficiency of a thermal engine is dependent in part on the efficiency of heat transfer between the combustion gases and the working fluid of the engine. In order to increase the efficiency of heat transfer from exhaust products of the combustion process generated by burner 122, to the working fluid contained within heater head 530 of the engine, a large wetted surface area, on either side of heater head 530 is required. Referring to FIG. 5, heater head 530 is substantially a cylinder having one closed end 532 (otherwise referred to as the cylinder head) and an open end 534. Closed end 532 is disposed in burner 122 as shown in FIG. 10a. Referring to FIG. 10b, in accordance with a preferred embodiment of the invention, fins or pins may be used to increase the interfacial area between the hot fluid combustion products and the solid heater head 530 so as to transfer heat, in turn, to the working fluid of the engine. Heater head 530 may have heat transfer pins 152, disposed on the exterior surface as shown in FIG. 10b, so as to provide a large surface area for the transfer of heat by conduction to heater head 530, and thence to the working fluid, from combustion gases flowing from burner 122 (shown in FIG. 10a) past the heat transfer pins. Heat transfer pins may also be disposed on the interior surface (not shown) of heater head 530. Interior-facing heat transfer pins serve to provide a large surface area for the transfer of heat by conduction from heater head 530 to the working fluid.

The use and method of manufacture of heat transfer pins is described in copending U.S. Pat. No. 6,381,958, titled "Stirling Engine Thermal System Improvements", incorporated by reference above.

{/102}Depending on the size of heater head 530, hundreds or thousands of inner transfer pins and outer heat transfer pins may be desirable. In accordance with certain embodiments of the invention, individual arrays of pins 150, comprise arcuate fractions of the circumferential distance around the heater head 530. This is apparent in the top view of the heater head assembly shown in perspective in FIG. 10b. Between successive heat transfer pin array segments 150 are trapezoidal dividers 506 which are baffled to block the flow of exhaust gases in a downward direction through any path other than past the heat transfer pins. Since exhaust gases do not flow through dividers 506, a temperature sensor, such as thermocouple 138 is advantageously disposed in divider 506 in order to monitor the temperature of heater head 530 with which the temperature sensor is in thermal contact.

Temperature sensing device 138 is preferably disposed within divider 506 as depicted in FIG. 10b. More particularly, temperature sensing tip 139 of temperature sensor 138 is preferably located in the slot corresponding to divider 506 as nearly as possible to cylinder head 332 in that this area is typically the hottest part of the heater head. Alternatively, temperature sensor 138 might be mounted directly to cylinder head 332; however location of the sensor in the slot, as described, is preferred. Engine performance, in terms of both power and efficiency, is highest at the highest possible temperature, yet the maximum temperature is typically limited by metallurgical properties. Therefore, sensor 138 should be placed to measure the temperature of the hottest, and therefore the limiting, part of the heater head. Additionally, temperature sensor 138 should be insulated from combustion gases and walls of divider 506 by ceramic insulation (not shown). The ceramic can also form an adhesive bond with the walls of the divider to retain the temperature sensor in place. Electrical leads 144 of temperature sensor 138 should also be electrically insulated.

Returning to FIG. 10a, exhaust gases follow path 1008 past heater head 530 and are then channeled up along path 1010, between chamber liner 1006 and inner insulation 1012, thereby absorbing additional heat from chamber liner 1006, with the additional advantage of preventing overheating of the chamber liner. The exhaust gases are then returned downward through preheater 1014 and exhausted around the circumference of heater head 530 as shown by arrows designated 1016. Preheater 1014 allows for exchange of heat from the exhaust gases to air taken in from the ambient environment, typically by an air pump or blower. Preheater 1014 may be fabricated from corrugated folder fins, typically, Inconel, however, any means for exchange of heat from the exhaust to the input air is within the scope of the present invention.

Figure 10C:
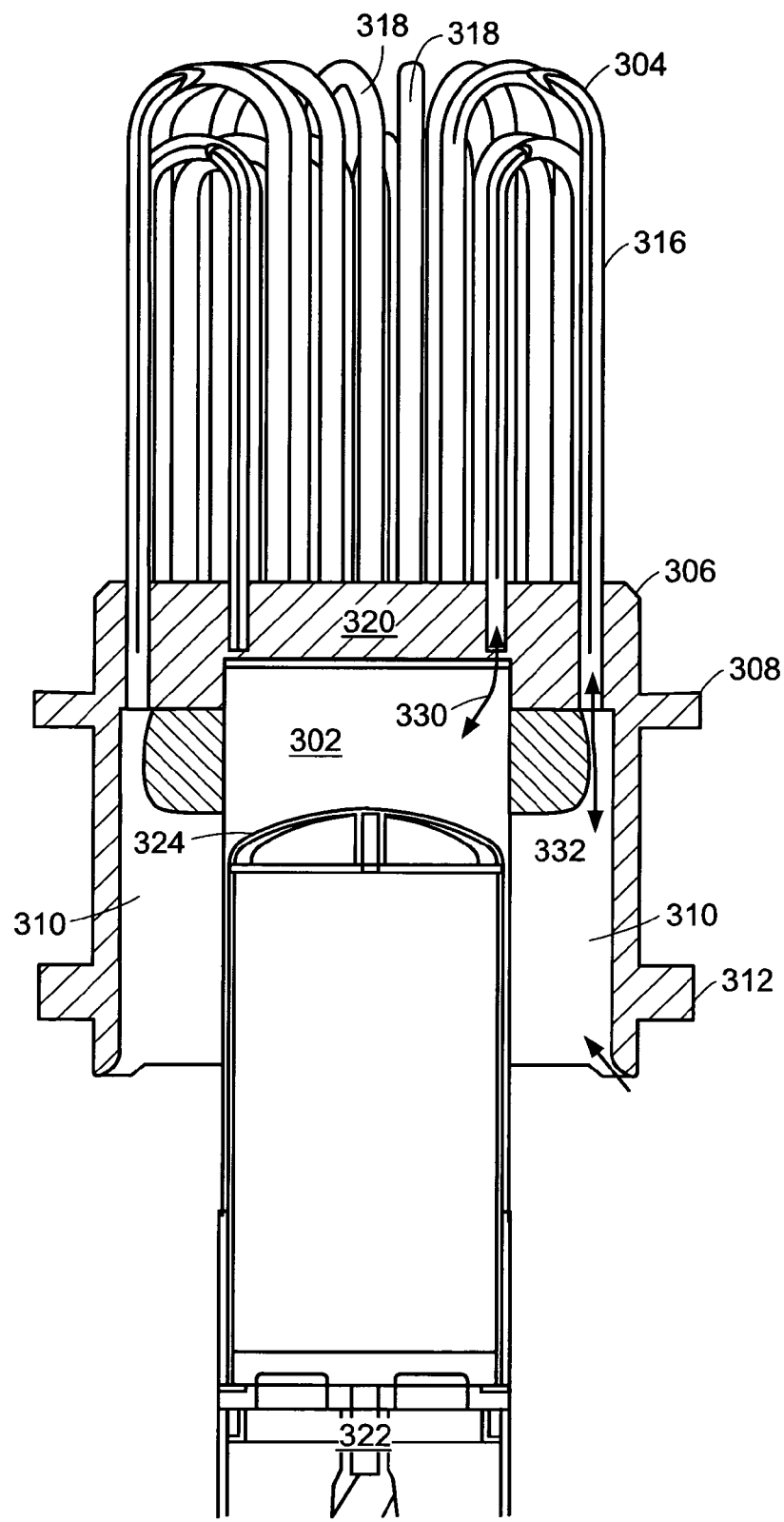
FIG. 10c shows a perspective view of an alternative heater head including heater transfer tubes in accordance with an embodiment of the invention.

In an alternative embodiment, heater tubes may be used to transfer heat from the hot fluid combustion products to the working fluid of the engine. FIG. 10c shows an exemplary heater head including heater tubes. Additional information on a preferred heater tube design is discussed in U.S. Pat. No. 6,543,215, entitled, Thermal Improvements for an External Combustion Engine, which is herein incorporated by reference.

Figure 11A:
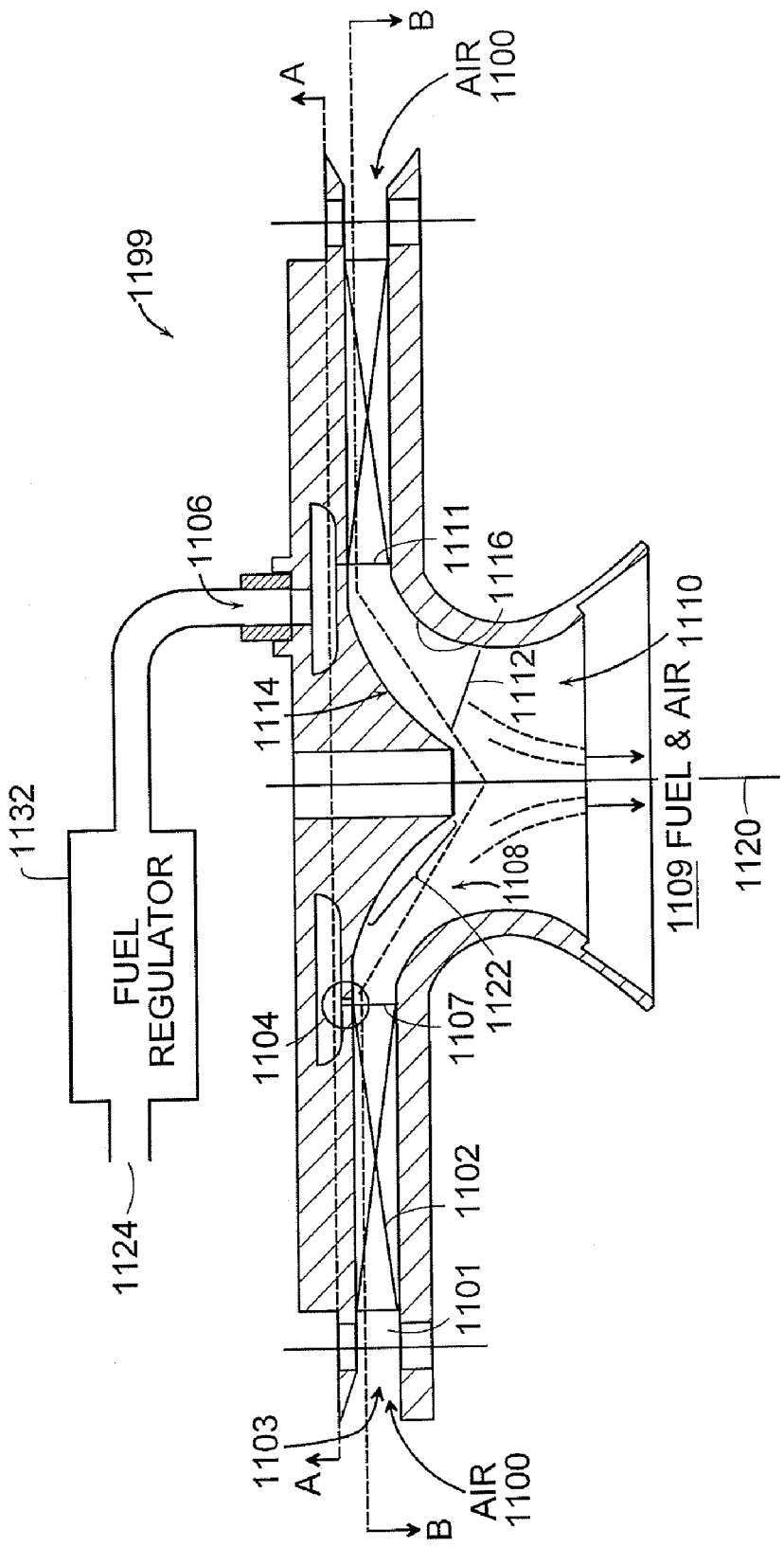
FIG. 11a shows a cross-sectional view from the side of a fuel intake manifold for a Stirling cycle engine in accordance with a preferred embodiment of the invention.
Figure 11B:
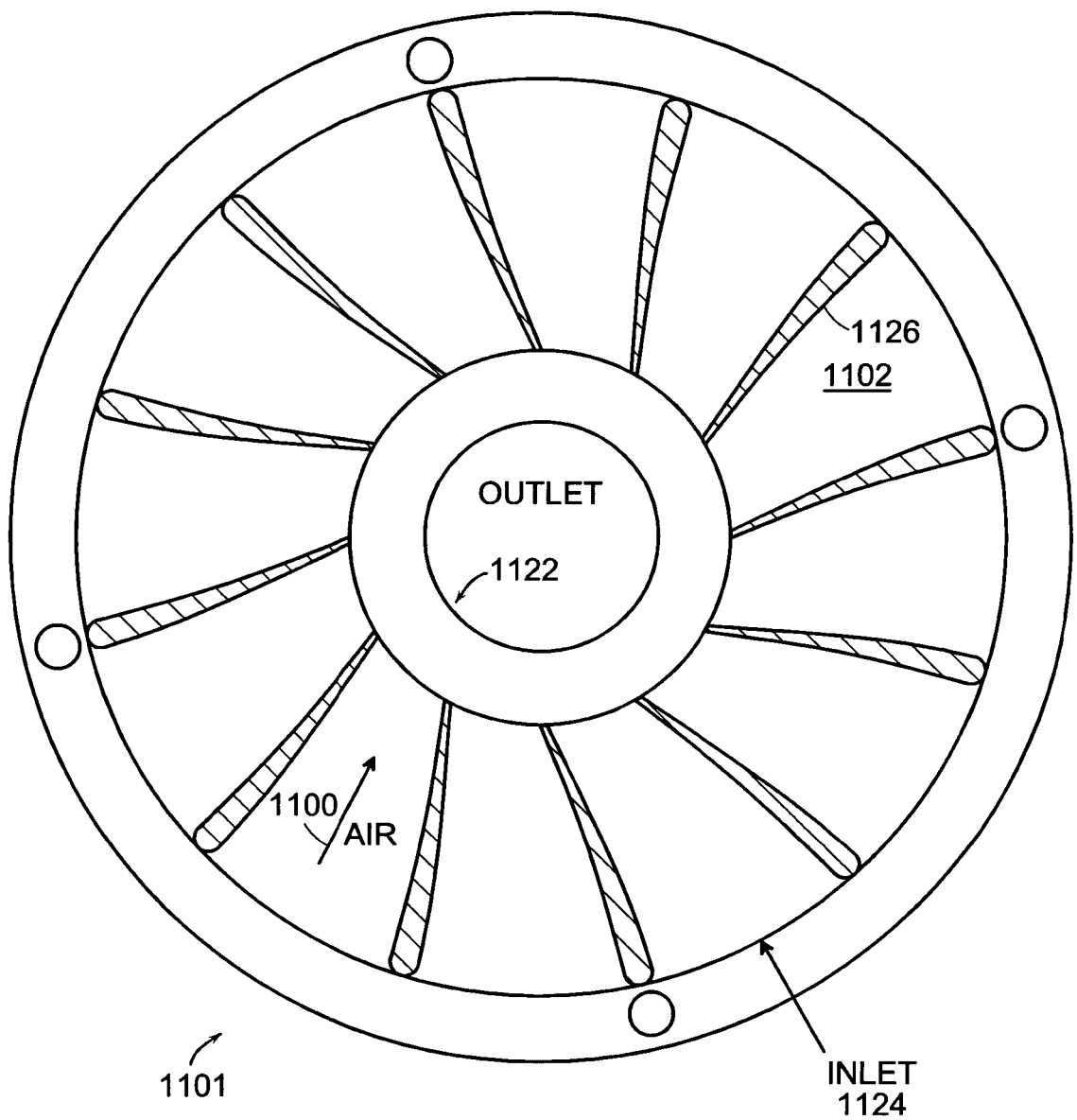
FIG. 11b shows a cross-sectional view from the top of the fuel intake manifold of FIG. 11a taken through cut BB.
Figure 11C:
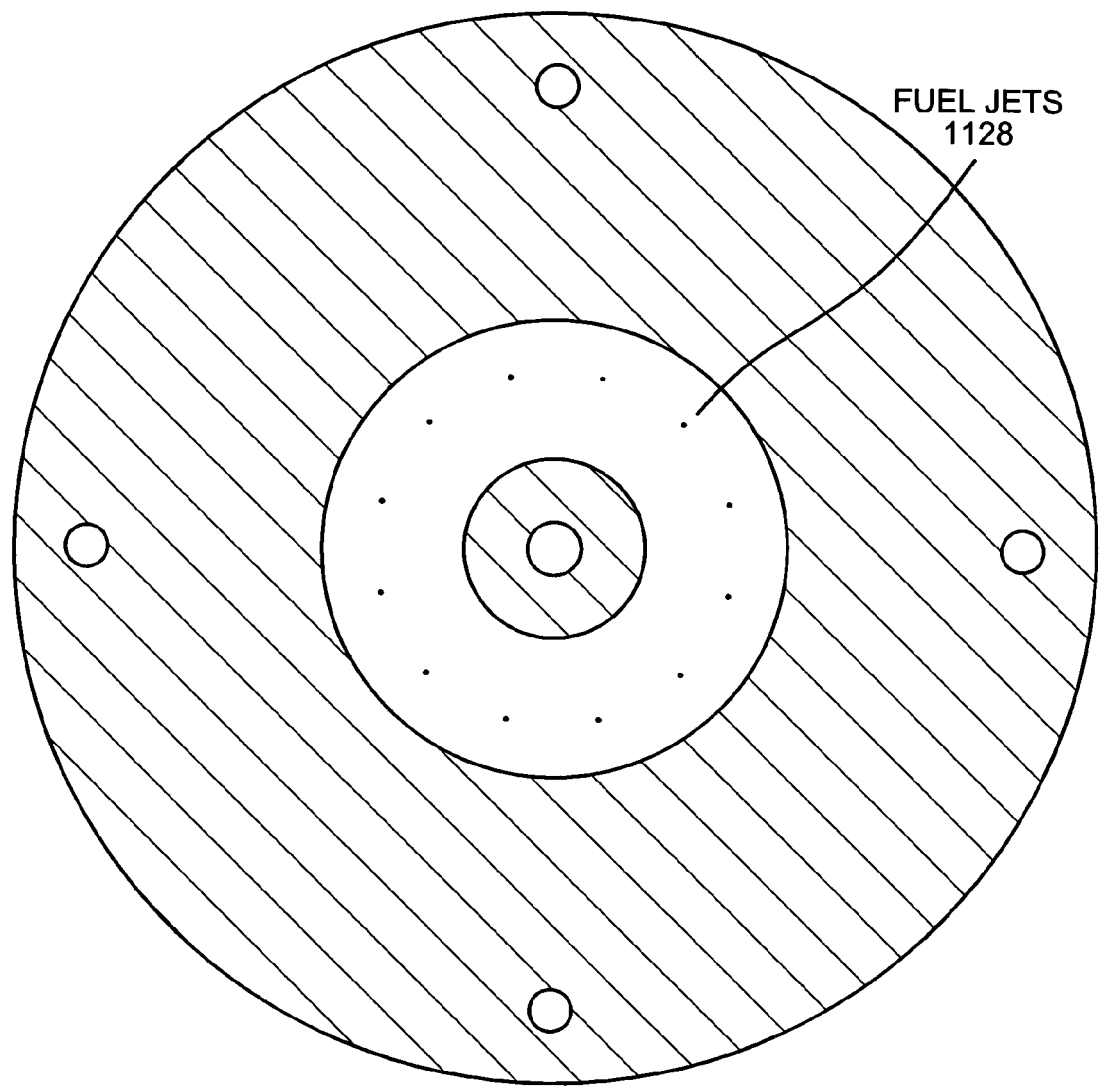
FIG. 11c is a cross-sectional view from the top of the fuel intake manifold of FIG. 1a taken through cut AA, showing the fuel jet nozzles.

Referring now to FIGS. 11a-11c, an intake manifold 1199 is shown for application to a Stirling cycle engine or other combustion application in accordance with an embodiment of the invention. In accordance with a preferred embodiment of the invention, fuel is pre-mixed with air that may be heated above the fuels auto-ignition temperature and a flame is prevented from forming until the fuel and air are well mixed. FIG. 11a shows a preferred embodiment of the apparatus including an intake manifold 1199 and a combustion chamber 1110. The intake manifold 1199 has an axisymmetrical conduit 1101 with an inlet 1103 for receiving air 1100. Air 1100 is pre-heated to a temperature, typically above 900K, which may be above the auto-ignition temperature of the fuel. Conduit 1101 conveys air 1100 flowing inward radially with respect to combustion axis 1120 to a swirler 1102 disposed within the conduit 1101.

FIG. 11b shows a cross sectional view of the conduit 1101 including swirler 1102 in accordance with an embodiment of the invention. In the embodiment of FIG. 11b, swirler 1102 has several spiral-shaped vanes 1126 for directing the flow of air 1100 radially inward and imparting a rotational component on the air. The diameter of the swirler section of the conduit decreases from the inlet 1124 to the outlet 1122 of swirler 1102 as defined by the length of the swirler section conduit 1101. The decrease in diameter of swirler vanes 1126 increases the flow rate of air 1100 in substantially inverse proportion to the diameter. The flow rate is increased so that it is above the flame speed of the fuel. At outlet 1122 of swirler 1102, fuel 1106, which in a preferred embodiment is propane, is injected into the inwardly flowing air.

In a preferred embodiment, fuel 1106 is injected by fuel injector 1104 through a series of nozzles 1128 as shown in FIG. 11c. More particularly, FIG. 11c shows a cross sectional view of conduit 1101 and includes the fuel jet nozzles 1128. Each of the nozzles 1128 is positioned at the exit of the swirler vanes 1126 and is centralized between two adjacent vanes. Nozzles 1128 are positioned in this way for increasing the efficiency of mixing the air and fuel. Nozzles 1128 simultaneously inject the fuel 1106 across the air flow 1100. Since the air flow is faster than the flame speed, a flame will not form at that point even though the temperature of the air and fuel mixture is above the fuel's auto-ignition temperature. In a preferred embodiment, where propane is used, the preheat temperature, as governed by the temperature of the heater head, is approximately 900 K.

Referring again to FIG. 11a, the air and fuel, now mixed, referred to hereafter as "air-fuel mixture" 1109, is transitioned in direction through a throat 1108 which has a contoured flairing and is attached to the outlet 1107 of the conduit 1101. Fuel 1106 is supplied via fuel regulator 1132. Throat 1108 has an inner radius 1114 and an outer dimension 1116. The transition of the air-fuel mixture is from a direction which is substantially transverse and radially inward with respect to combustion axis 1120 to a direction which is substantially parallel to the combustion axis. The contour of the flairing of throat 1108 has the shape of an inverted bell such that the cross sectional area of throat 1108 with respect to the combustion axis remains constant from the inlet 1111 of the throat to outlet 1112 of the throat. The contour is smooth without steps and maintains the flow speed from the outlet of the swirler to the outlet of the throat 1108 to avoid separation and the resulting recirculation along any of the surfaces. The constant cross sectional area allows the air and fuel to continue to mix without decreasing the flow speed and causing a pressure drop. A smooth and constant cross section produces an efficient swirler, where swirler efficiency refers to the fraction of static pressure drop across the swirler that is converted to swirling flow dynamic pressure. Swirl efficiencies of better than 80% may typically be achieved by practice of the invention. Thus, the parasitic power drain of the combustion air fan may be minimized.

Outlet 1112 of the throat flares outward allowing the air-fuel mixture 1109 to disperse into the chamber 1110 slowing the air-fuel mixture 1109 thereby localizing and containing the flame and causing a toroidal flame to form. The rotational momentum generated by the swirler 1102 produces a flame stabilizing ring vortex as well known in the art. The operation of the fuel intake valve as shown in FIGS. 11a-11c is further described in U.S. Pat. No. 6,062,023, which is herein incorporated by reference.

The described embodiments of the invention are intended to be merely exemplary and numerous variations and modifications will be apparent to those skilled in the art. All such variations and modifications are intended to be within the scope of the present invention as defined in the appended claims.

We claim:

1. A personal vehicle for transporting a user over a surface, the personal vehicle comprising:
   a. a support for supporting the user;
   b. a ground contacting module having at least one ground contacting member to which the support is mounted, the ground contacting module for suspending the user in the support over the surface, the support and ground contacting module being components of an assembly;
   c. a drive arrangement coupled to the assembly for causing locomotion of the assembly and the user over the surface, the drive arrangement comprising:
      i. an external combustion engine for generating mechanical energy and thermal energy;
      ii. a generator having an output coupled to the external combustion engine, the generator for converting the mechanical energy produced by the external combustion engine to electrical energy that is provided at the output to the assembly;
      iii. an energy storage device coupled to the output of the generator, for storing power provided by the generator and for providing electric power to the external combustion engine and locomotive power to the assembly; and
      iv. a drive motor coupled to the energy storage device and the assembly, the drive motor powered entirely by the locomotive power provided by the energy storage device; and
   d. a controller, coupled to the drive arrangement, for controlling a total electrical power load placed on the external combustion engine such that short term regulation of external combustion engine temperature is provided.

2. A personal vehicle according to claim 1, wherein the external combustion engine is a Stirling cycle engine.

3. A personal vehicle according to claim 1, wherein the external combustion engine and the generator are housed in a hermetically sealed pressure vessel.

4. A personal vehicle according to claim 1, wherein the thermal energy produced by the external combustion engine provides heat to an area surrounding the personal vehicle.

5. A personal vehicle according to claim 1, further including a power output coupled to the energy storage device, for providing power to an external load.

6. A personal vehicle according to claim 5, wherein the power from the power output is AC power.

7. A personal vehicle according to claim 1, the assembly having a projection onto the surface that has substantially the same dimensions as the user.

8. A personal vehicle according to claim 1, wherein the support defines fore-aft and lateral planes, the personal vehicle unstable to tipping in at least one of the fore-aft and lateral planes when unpowered, the vehicle capable of maintaining dynamic balance in at least one of the fore-aft and lateral planes.

9. A personal vehicle according to claim 1, wherein the support includes a platform on which the user can stand.

10. A personal vehicle according to claim 1, wherein the support includes a seat.

* * * * *